US012682194B2

(12) United States Patent　　　(10) Patent No.: US 12,682,194 B2
Loh et al.　　　　　　　　　　　　　(45) Date of Patent:　　Jul. 14, 2026

(54) MECHANICAL METAMATERIAL PASSIVE WIRELESS SENSORS

(71) Applicant: The Regents of the University of California, Oakland, CA (US)

(72) Inventors: Kenneth Loh, San Diego, CA (US); Yujin Park, La Jolla, CA (US); Omid Salehi-Abari, Los Angeles, CA (US); Vishnu Naidu, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 19/078,149

(22) Filed: Mar. 12, 2025

(65) Prior Publication Data

US 2025/0292052 A1　　Sep. 18, 2025

Related U.S. Application Data

(60) Provisional application No. 63/564,412, filed on Mar. 12, 2024.

(51) Int. Cl.
*G06K 19/02*　　　(2006.01)
*G06K 19/077*　　(2006.01)

(52) U.S. Cl.
CPC ..... *G06K 19/027* (2013.01); *G06K 19/07762* (2013.01)

(58) Field of Classification Search
None
See application file for complete search history.

(56) References Cited

U.S. PATENT DOCUMENTS 11,875,211 B1 * 1/2024 Cox ................... G06K 19/0717

FOREIGN PATENT DOCUMENTS

WO　WO-2024254321 A1 * 12/2024 ............. A61F 13/58

OTHER PUBLICATIONS

Y. Park, G. Vella, and K. J. Loh, "Bio-Inspired Active Skins for Surface Morphing," Scientific Reports, vol. 9, No. 1, Dec. 2019, pp. 1-10.
L. Tang, L. Gong, G. Zhou, L. Liu, D. Zhang, J. Tang, and J. Zheng, "Design of Low Temperature-Responsive Hydrogels used as a Temperature Indicator," Polymer (Guildf), vol. 173, pp. 182-189, May 2019.

(Continued)

*Primary Examiner* — Kristy A Haupt
(74) *Attorney, Agent, or Firm* — Perkins Coie LLP

(57)　　　　　ABSTRACT

Mechanical metamaterial passive wireless sensors and methods of use thereof are disclosed. An example sensor includes a flexible substrate having multiple extending arms; at least one temperature responsive actuator coupled to the substrate; and an antenna embedded within the substrate and extending along at least a portion of the multiple extending arms, the antenna configured to deform with the substrate. The substrate may be configured to be activated upon exposure of the at least one temperature responsive actuator to an environmental temperature that exceeds a threshold, and further configured to transform into at least one three-dimensional configuration in response to a duration of immersion in a liquid following the activation, the three-dimensional configuration causing a detectable change in electromagnetic signal characteristics of the antenna.

20 Claims, 21 Drawing Sheets

2000

(56) References Cited

OTHER PUBLICATIONS

D. Keskin, T. Mokabbar, Y. Pei, and P. van Rijn, "The Relationship between Bulk Silicone and Benzophenone-Initiated Hydrogel Coating Properties," Polymers 2018, vol. 10, No. 5, 14 pages, May 2018.

B. A. Grzybowski, R. Haag, N. Bowden, and G. M. Whitesides, "Generation of Micrometer- Sized Patterns for Microanalytical Applications Using a Laser Direct-Write Method and Microcontact Printing," Annual Review of Materials Research, vol. 37, No. 3, pp. 4645-4652, 1998.

H. Yuk, T. Zhang, G. A. Parada, X. Liu, and X. Zhao, "Skin-inspired hydrogel-elastomer hybrids with robust interfaces and functional microstructures," Nature Communications, vol. 7, Jun. 2016, 11 pages.

Y. Park and K. J. Loh, "Surface morphing control of mechanical metamaterials using geometrical imperfections", J Mater Sci (2023) 58:13691-13704.

* cited by examiner

200

300

Pristine State          Deformed State

Sepal tip

Petal tip (Top view)

Auxetic geometry

DBS    DBP (Side view)

Desired shape morphing
response

Passive actuator based on stimuli-responsive polymer at base
of star swells/deswells at different temperatures

1900

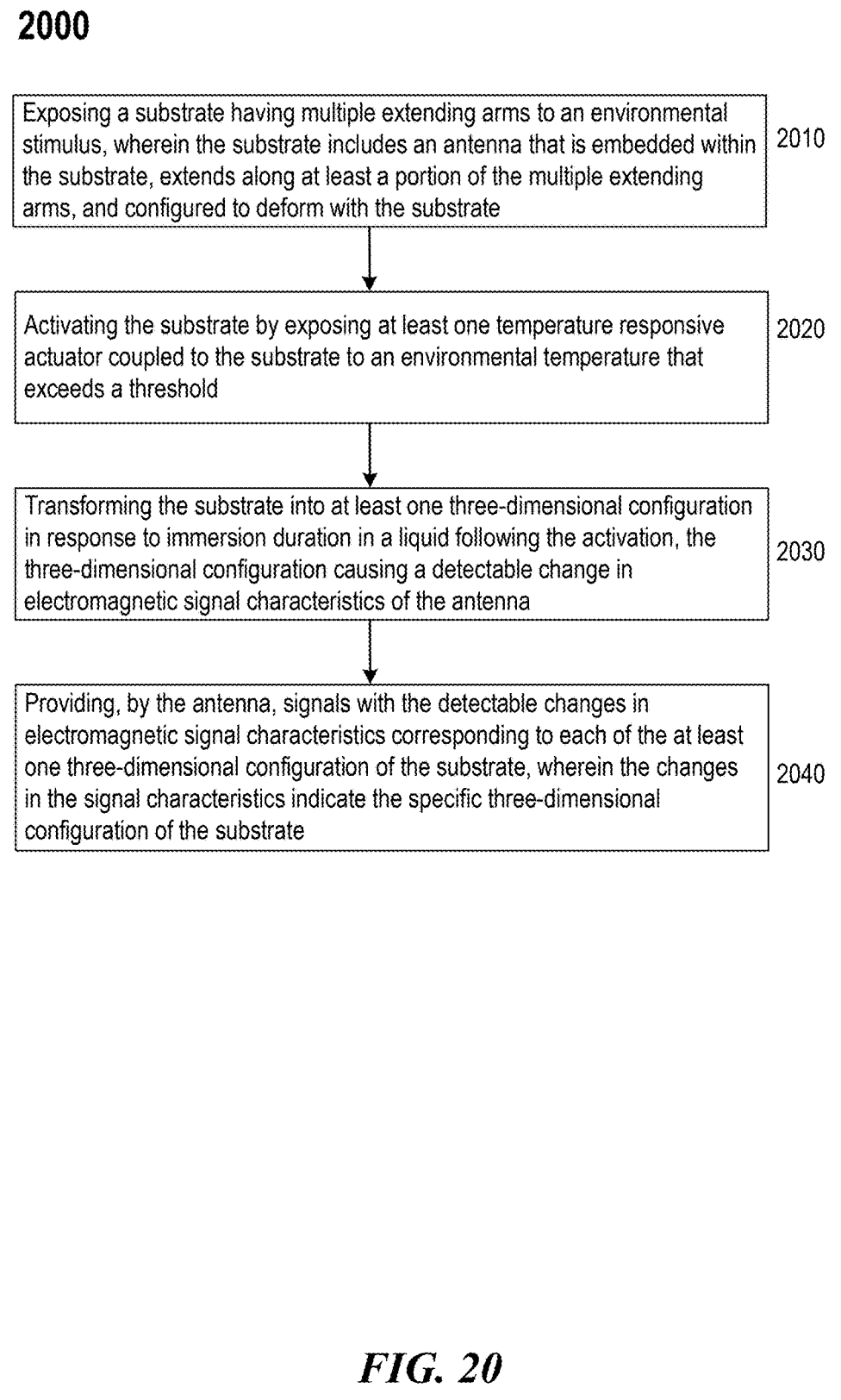

2000

| Exposing a substrate having multiple extending arms to an environmental stimulus, wherein the substrate includes an antenna that is embedded within the substrate, extends along at least a portion of the multiple extending arms, and configured to deform with the substrate | 2010 |

↓

| Activating the substrate by exposing at least one temperature responsive actuator coupled to the substrate to an environmental temperature that exceeds a threshold | 2020 |

↓

| Transforming the substrate into at least one three-dimensional configuration in response to immersion duration in a liquid following the activation, the three-dimensional configuration causing a detectable change in electromagnetic signal characteristics of the antenna | 2030 |

↓

| Providing, by the antenna, signals with the detectable changes in electromagnetic signal characteristics corresponding to each of the at least one three-dimensional configuration of the substrate, wherein the changes in the signal characteristics indicate the specific three-dimensional configuration of the substrate | 2040 |

*FIG. 20*

MECHANICAL METAMATERIAL PASSIVE WIRELESS SENSORS

CROSS-REFERENCE TO RELATED APPLICATIONS

This application claims priority to the provisional application with Ser. No. 63/564,412, titled "MECHANICAL METAMATERIAL PASSIVE WIRELESS SENSORS," filed Mar. 12, 2024. The entire contents of the above noted provisional application are incorporated by reference as part of the disclosure of this document.

STATEMENT REGARDING FEDERALLY SPONSORED RESEARCH OR DEVELOPMENT

This invention was made with government support under grant nos. N00014-22-1-2591 and N00014-23-1-2711 awarded by the Office of Naval Research. The government has certain rights in the invention.

TECHNICAL FIELD

The present disclosure relates to passive wireless sensors for environmental monitoring.

BACKGROUND

Maritime safety and search and rescue operations are important considerations for naval and commercial vessels. Environmental factors such as water temperature, sea state, and weather conditions can affect personnel in marine environments.

SUMMARY

An aspect of the present document relates to a passive wireless mechanical metamaterial sensor. In some embodiments, the passive wireless mechanical metamaterial sensor includes a flexible substrate having multiple extending arms; at least one temperature responsive actuator coupled to the substrate; and an antenna embedded within the substrate and extending along at least a portion of the multiple extending arms, the antenna configured to deform with the substrate. In some embodiments, the substrate is configured to be activated upon exposure of the at least one temperature responsive actuator to an environmental temperature that exceeds a threshold, and further configured to transform into at least one three-dimensional configuration in response to a duration of immersion in a liquid following the activation, the three-dimensional configuration causing a detectable change in electromagnetic signal characteristics of the antenna.

Another aspect of the present document relates to a method of monitoring environmental conditions using a passive wireless mechanical metamaterial sensor. In some embodiments, the method includes exposing a substrate having multiple extending arms to an environmental stimulus, wherein the substrate includes an antenna that is embedded within the substrate, extends along at least a portion of the multiple extending arms, and configured to deform with the substrate; activating the substrate by exposing at least one temperature responsive actuator coupled to the substrate to an environmental temperature that exceeds a threshold; transforming the substrate into at least one three-dimensional configuration in response to the duration of immersion in a liquid following the activation, the three-dimensional configuration causing a detectable change in electromagnetic signal characteristics of the antenna; and providing, by the antenna, signals with the detectable changes in electromagnetic signal characteristics corresponding to each of the at least one three-dimensional configuration of the substrate, wherein the changes in the signal characteristics indicate the specific three-dimensional configuration of the substrate.

A further aspect of the present document relates to a system for monitoring personnel in marine environments. In some embodiments, the system includes a wearable patch including a passive wireless mechanical metamaterial sensor, the sensor comprising: a substrate with multiple extending arms, an embedded antenna, and an identification chip; and a remote reader configured to wirelessly interrogate the sensor. In some embodiments, the substrate is configured to undergo shape morphing in response to environmental stimuli, causing detectable changes in an electromagnetic signature of the embedded antenna.

Still further aspects of the present document relate to a passive environmental sensor and a method of using the sensor. In some embodiments, the sensor includes a deformable substrate; at least one stimulus-responsive element coupled to the substrate; and a detection component embedded within the substrate and configured to deform with the substrate. In some embodiments, the substrate is configured to change configuration in response to at least one environmental stimulus, and the change in configuration of the substrate causes a detectable change in a measurable characteristic of the detection component.

The foregoing general description of the illustrative embodiments and the following detailed description thereof are merely exemplary aspects of the teachings of this disclosure and are not restrictive.

BRIEF DESCRIPTION OF FIGURES

Non-limiting and non-exhaustive examples are described with reference to the following figures.

FIG. 20 illustrates a process for using a passive environmental sensor, according to some embodiments of the present document.

DETAILED DESCRIPTION

Figure 1A:
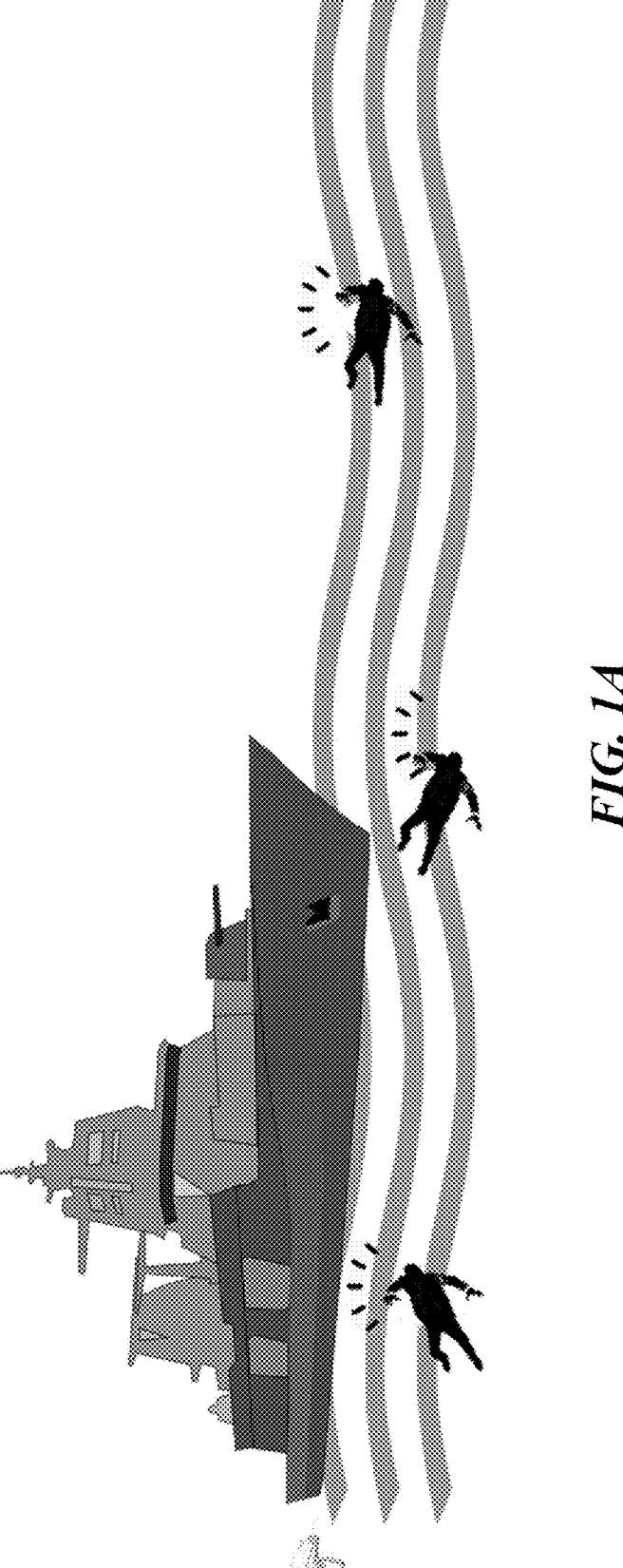
FIG. 1A illustrates a perspective view of a wearable passive sensor system for monitoring personnel in marine environments, according to some embodiments of the present document.

The following description sets forth exemplary aspects of the present disclosure. It should be recognized, however, that such description is not intended as a limitation on the scope of the present disclosure. Rather, the description also encompasses combinations and modifications to those exemplary aspects described herein.

Maritime search and rescue operations face significant challenges when locating personnel who have fallen overboard, with traditional methods limited by visibility, weather conditions, and the vast expanse of open water.

Current person-overboard detection systems include fixed camera-based technologies, actively monitored personal devices (wristbands, fobs), and active wearables (safety vests). These systems have inherent limitations: fixed systems require pre-installation in specific ship areas; personal devices and wearables depend on functioning batteries and consistent wearing; and most only provide basic identification and initial location data without ongoing tracking capabilities or environmental condition monitoring. A passive, always-worn sensor that can provide sailor identification, event location, and seawater conditions would significantly enhance the effectiveness of search and rescue operations by enabling better resource prioritization and deployment.

The present document provides a passive, person-overboard sensing, suitable for monitoring of seawater conditions and other use cases, that addresses and other challenges. Some embodiments of the sensor can be worn as a wearable patch, which can be remotely interrogated to obtain the aforementioned information following a person-overboard event. In example use cases, this passive patch sensor, when always worn by sailors as part of their uniforms, can facilitate their search and rescue during an emergency.

The passive sensor leverages the concept of a Bio-inspired Active Skin (BIAS), in which two-dimensional (2D) patterns with a printed conductive trace antenna can morph into three-dimensional (3D) structures upon the application of in-plane strains. The 2D structure in this case is an elastomeric auxetic star unit cell pattern, with a temperature-responsive hydrogel actuator on both ends (see, e.g., FIGS. 2 and 3). In-plane strain is generated by the deswelling behavior of the bookended temperature-responsive hydrogels. This design results in a structure that can shape morph in response to one or more changing environmental stimuli, e.g., temperature, which may in turn modify its antenna signature as measured by a remote wireless reader. The changing antenna geometry produces detectable variations in electromagnetic signals, which can be interpreted to estimate the condition of the person to be rescued. This information allows rescue teams to prioritize their efforts based on the inferred status of multiple individuals. The passive wireless mechanical metamaterial sensor thus provides information on personnel identity, location, and environmental exposure to facilitate more effective search and rescue operations. The passive wireless mechanical metamaterial sensor system may offer a solution that overcomes the above described and other challenges by providing a battery-free, long-lasting monitoring capability that can operate in harsh marine environments while delivering real-time data on personnel status and surrounding conditions.

FIG. 1A illustrates an example implementation of the passive wireless mechanical metamaterial sensor system. The system may include multiple sensor patches worn by personnel on a naval vessel. When a person falls overboard, the sensor patch may be detected by wireless readers at various positions relative to the vessel. This capability allows for tracking and monitoring of multiple subjects simultaneously in a marine environment.

Figure 1B:
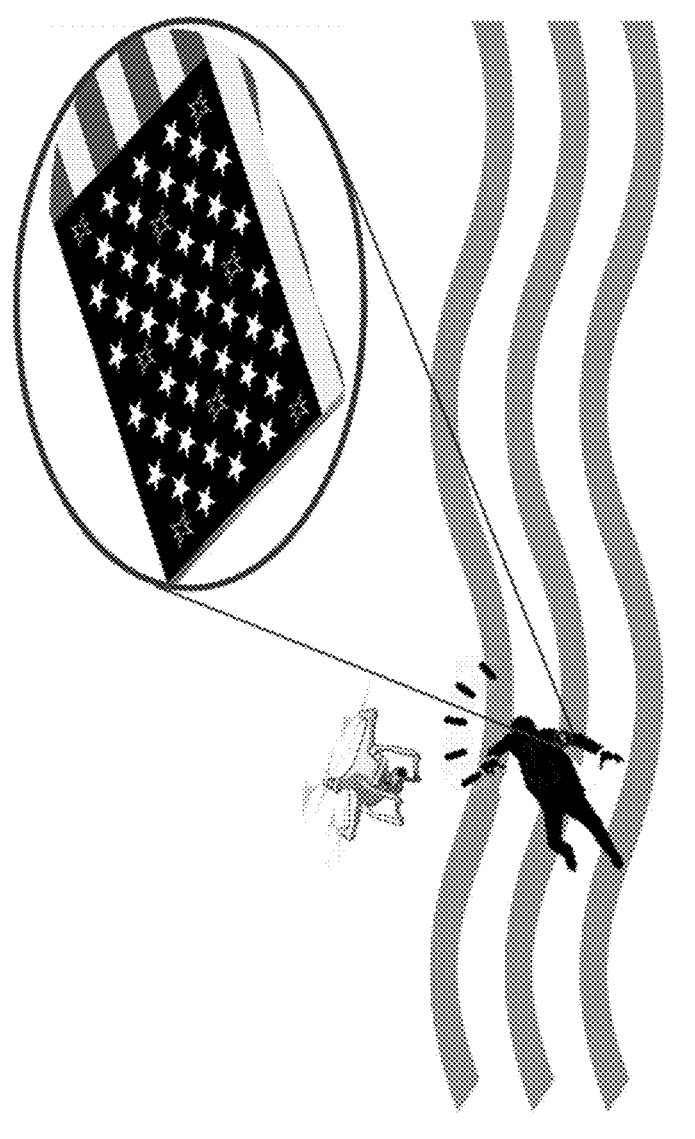
FIG. 1B illustrates a schematic view of a wearable passive antenna sensor system in an aquatic environment, according to some embodiments of the present document.

FIG. 1B shows a schematic view of how the wearable sensor patch may function in a maritime environment. The sensor patch may incorporate a star-shaped pattern containing an antenna design. In some cases, the star pattern may undergo shape morphing when exposed to water, causing changes in the antenna configuration. These changes in antenna geometry may allow the sensor to wirelessly communicate information about water exposure and temperature conditions when interrogated by a remote reader.

The passive wireless mechanical metamaterial sensor system may operate without batteries by leveraging shape-morphing materials that respond to environmental stimuli. In some cases, the sensor patches may include temperature-responsive hydrogels that contract when exposed to cold water. This contraction may induce mechanical strain in the star-shaped pattern, causing it to transform from a two-dimensional to a three-dimensional configuration. The changing three-dimensional geometry of the antenna embedded in the star pattern may produce detectable changes in its electromagnetic signature.

By integrating stimuli-responsive materials, shape-morphing structures, and passive antennas, the system may provide information to facilitate search and rescue efforts. The sensor patches may communicate the identity of personnel who have fallen overboard, their location, and ambient environmental conditions without requiring active power sources. This passive sensing approach may allow for extended monitoring capabilities compared to battery-powered devices.

Figure 2:
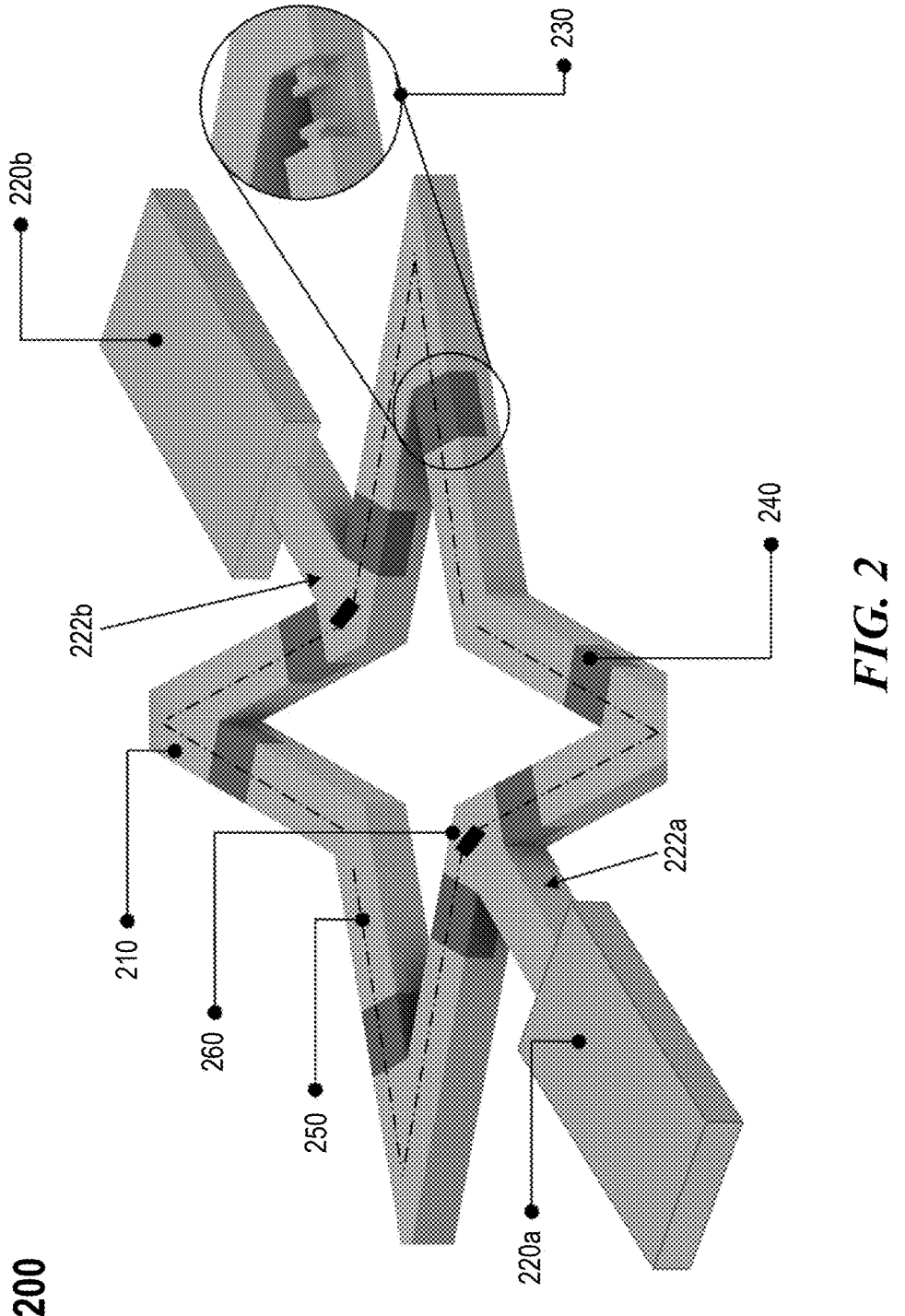
FIG. 2 illustrates an isometric view of a passive wireless mechanical metamaterial sensor, according to some embodiments of the present document.

FIG. 2 illustrates an isometric view of a passive wireless mechanical metamaterial sensor according to some embodiments of the present document. The passive wireless mechanical metamaterial sensor 200 includes a flexible substrate formed as a star pattern 210 having multiple extending arms that radiate outward from a central portion.

In some embodiments, the star pattern 210 may include a skeleton made of polydimethylsiloxane (PDMS), thermoplastic polyurethane (TPU), or another flexible and durable material, with a coating including an elastomer applied over the skeleton. The skeleton plus coating design of the sensor 200 may offer several technical benefits and functions. In some aspects, the combination of a flexible skeleton material such as PDMS or TPU with an elastomer coating may provide a robust and adaptable structure for the sensor.

The skeleton structure may serve as the primary framework for the star pattern, providing mechanical support and defining the overall geometry. This skeleton may be designed with specific mechanical properties to facilitate controlled deformation and shape morphing in response to environmental stimuli. In some cases, the flexibility of materials like PDMS or TPU may allow the skeleton to undergo reversible deformations without permanent damage, enabling the sensor to be reused for multiple detection cycles.

The elastomer coating applied over the skeleton may enhance the sensor's performance and durability in several ways. In some cases, the coating may act as a protective barrier, shielding the underlying skeleton and embedded components from environmental factors such as moisture, chemicals, and physical abrasion. This protection may extend the operational lifespan of the sensor in harsh marine environments.

The coating may also contribute to the sensor's mechanical behavior. In some implementations, the elastomer coating may be formulated to have specific elastic properties that complement those of the skeleton material. This combination may allow for precise control over the sensor's deformation characteristics, enabling predictable and repeatable shape morphing behavior.

An embedded antenna 250 may extend along portions of the star pattern 210. The antenna 250 may be continuously distributed throughout the substrate to maximize sensitivity to deformation. In some cases, the embedded antenna 250 may be a silver trace antenna or a conductive material patterned directly onto or within the substrate. The antenna 250 extends along at least a portion of the multiple extending arms and is specifically configured to deform with the substrate. This co-deformation may facilitate the sensor's function, as electromagnetic signals are substantially reflected by the antenna in a manner that encodes the deformation state of the substrate and/or antenna within the electromagnetic signal characteristics (or referred to as electromagnetic signature). As the antenna geometry changes through deformation, its resonant frequency, impedance, and radiation pattern are altered in a detectable and predictable way, allowing remote systems to interpret the physical state of the sensor through wireless interrogation.

In terms of antenna integration, the skeleton plus coating design may offer advantages for embedding and protecting the antenna structure. The antenna may be incorporated directly into the skeleton material or applied as a conductive layer between the skeleton and coating. In some cases, the coating may serve as a dielectric layer, influencing the antenna's electromagnetic properties.

Additionally, the coating may be engineered to have specific surface properties that enhance the antenna's performance. For example, in some implementations, the coating may be designed with a hydrophobic surface to reduce water adhesion, potentially minimizing interference with the antenna's electromagnetic behavior in wet environments.

The skeleton plus coating design may also facilitate the integration of other functional components, such as stimuli-responsive materials or identification chips, while maintaining a unified and mechanically robust structure. This integrated approach may enable the creation of a multifunctional sensor system capable of responding to various environmental inputs and wirelessly communicating complex information.

At least one temperature responsive actuator is coupled to the substrate. In the illustrated embodiment, a first temperature responsive actuator 220a and a second temperature responsive actuator 220b are positioned at opposite ends of the star pattern 210, coupled to different regions of the substrate, respectively. The first temperature responsive actuator 220a may be connected to the star pattern 210 via a first elastomer connector 222a, while the second temperature responsive actuator 220b may be connected via a second elastomer connector 222b. In some embodiments, one temperature responsive actuator may be coupled to different regions (e.g., opposite regions) of the substrate simultaneously. For example, two ends of a temperature responsive actuator are simultaneously coupled to different regions (e.g., opposite regions) of the substrate from inside the star pattern 210.

The temperature responsive actuators 220a and 220b may provide passive actuation for the star pattern 210. These actuators may comprise temperature-responsive hydrogels, such as N-tert-butyl acrylamide (NTBAM)-N-isopropyl acrylamide (NIPAM)-acrylamide (AM) copolymer hydrogels. The hydrogels may be engineered to respond to different temperature thresholds depending on the specific application requirements. For example, some hydrogels may be formulated to contract when the environmental temperature falls below a threshold temperature (e.g., detecting cold water conditions), while others may be designed to contract when the environmental temperature exceeds a threshold temperature (e.g., detecting warming events). This versatility allows the sensor to be customized for detecting both cold and hot temperature extremes in various environments. The phrase "environmental temperature that exceeds a threshold" encompasses both scenarios where the actual temperature rises above an upper threshold or falls below a lower threshold, as both cases represent the temperature exceeding the operational boundary defined for the specific hydrogel formulation.

When exposed to temperature variations, the actuators 220a and 220b may undergo dimensional changes. For example, they may contract when exposed to an environmental temperature that exceeds a threshold, thereby applying tension to the substrate. This temperature-dependent behavior may be achieved through the use of materials with specific thermal expansion properties or phase transition characteristics. In some embodiments, the temperature responsive actuators may be pre-tensioned when connected to the substrate prior to being exposed to the environmental temperature that exceeds the threshold.

The dimensional changes of the actuators 220a and 220b may induce mechanical strain in the star pattern 210 through the elastomer connectors 222a and 222b. The extent and nature of the deformation may depend on factors such as the magnitude of the temperature change, the material properties of the actuators, and the geometric design of the star pattern.

In some embodiments, the passive actuation provided by the temperature responsive actuators 220a and 220b may enable the star pattern 210 to adapt its shape and electromagnetic properties in response to environmental conditions without requiring any active control or power input. When the at least one temperature responsive actuator is exposed to an environmental temperature that exceeds a threshold, the substrate is activated. This passive responsiveness may allow the sensor 200 to operate autonomously for extended periods in marine environments. Without the passive actuation, such additional deformation is prevented, or follows a different pattern. In some embodiments, the passive actuation itself does not directly cause the arms of the star pattern 210 to deform.

The star pattern 210 may include one or more mechanical notches 230 positioned along its arms. In some cases, the mechanical notches 230 may contain a soluble notch filler 240. The soluble notch filler 240 may be made of poly(vinyl alcohol) (PVA), which can dissolve when exposed to liquid. The soluble notch filler in each of the mechanical notches may have a predetermined dimension that relates to a dissolution rate when exposed to the liquid, wherein dissolution of the soluble notch filler in a mechanical notch causes a corresponding arm of the multiple extending arms to deform. Different dimensions of the soluble notch filler in different mechanical notches may cause sequential deformation of different arms over time, resulting in a progressive transformation of the substrate.

Following activation of the substrate by the temperature responsive actuators, the substrate is further configured to transform into at least one three-dimensional configuration in response to a duration of immersion in a liquid. In some embodiments, the substrate may transform into a plurality of different three-dimensional configurations in response to the duration. The configuration of the embedded antenna 250 changes as the star pattern 210 deforms, with each three-dimensional configuration causing a corresponding detectable change in electromagnetic signal characteristics of the antenna.

The sensor 200 may also include an identification chip 260 incorporated into the star pattern 210. The identification chip 260 is a passive component, requiring no internal power source, that responds to external interrogation signals. In some cases, the identification chip 260 may be a passive radio-frequency identification (RFID) chip. Examples of suitable passive identification chips include ISO/IEC 14443 compliant chips, EPC Class 1 Gen 2 chips, or custom-designed passive transponders optimized for maritime applications. The identification chip 260 may be used to provide unique identification information when interrogated by a remote reader, allowing each sensor to be individually tracked and monitored within a network of deployed sensors. A sensor ID may be linked to a user (e.g., sailor, first responder, firefighter, etc.), allowing the user's identity to be determined based on the sensor's ID.

The temperature responsive actuators 220a and 220b may contract in response to temperature changes. This contraction may apply tension to the star pattern 210 through the elastomer connectors 222a and 222b. As the soluble notch filler 240 dissolves over time when exposed to liquid, different arms of the star pattern 210 may deform sequentially. This sequential deformation may cause corresponding changes in the configuration of the embedded antenna 250, thereby causing the substrate to achieve one of the at least one three-dimensional configuration. Each different three-dimensional configuration causes a corresponding detectable change in electromagnetic signal characteristics of the antenna, which can be used to determine environmental conditions such as the duration of immersion in a liquid (freshwater, seawater, etc.).

Figure 3:
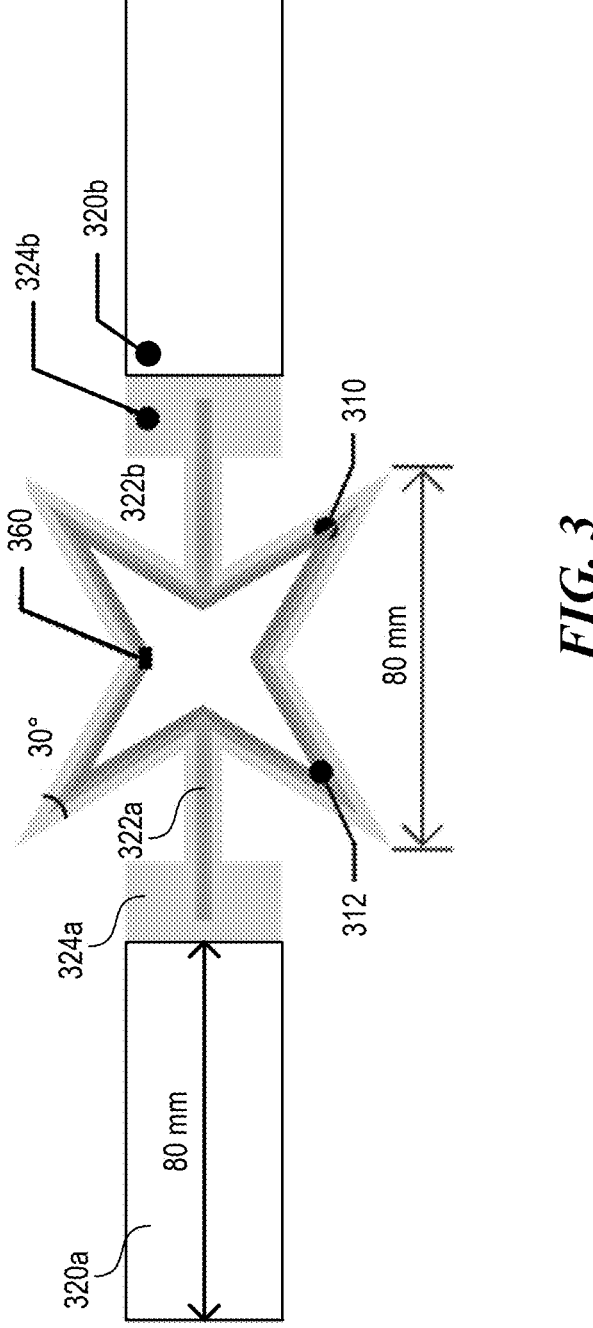
FIG. 3 illustrates an orthogonal view of a passive wireless mechanical metamaterial sensor, according to some embodiments of the present document.

FIG. 3 illustrates an orthogonal view of a passive wireless mechanical metamaterial sensor according to some embodiments of the present document. The passive wireless mechanical metamaterial sensor 300 may include a star pattern 310 having a central portion with multiple extending arms. In some cases, the star pattern 310 may include a thermoplastic polyurethane (TPU) skeleton.

A first hydrogel actuator 320a and a second hydrogel actuator 320b may be positioned at opposite ends of the star pattern 310. In the illustrated example, the first hydrogel actuator 320a and the second hydrogel actuator 320b are spaced approximately 80 mm apart. The first hydrogel actuator 320a may be connected to the star pattern 310 via a first extension arm 322a, while the second hydrogel actuator 320b may be connected via a second extension arm 322b.

A first elastomer connector 324a may couple the first hydrogel actuator 320a to the first extension arm 322a. Similarly, a second elastomer connector 324b may couple the second hydrogel actuator 320b to the second extension arm 322b.

A silver trace 312 may be integrated within the star pattern 310 to form an antenna structure. In the illustrated example, the star pattern 310 includes arms having tips with a 30° rib angle.

An identification chip 360 may be embedded within the star pattern 310 and electrically connected to the conductive trace 312. The identification chip 360 and conductive trace 312 may enable wireless communication when the sensor is interrogated by a remote reader.

The first hydrogel actuator 320a and the second hydrogel actuator 320b may be designed to respond to temperature changes by expanding or contracting. This expansion or contraction may induce mechanical strain in the star pattern 310 through the first extension arm 322a, second extension arm 322b, first elastomer connector 324a, and second elastomer connector 324b. The mechanical strain may cause the star pattern 310 to transform from a two-dimensional to a three-dimensional configuration.

The sensor 300 may incorporate temperature-responsive hydrogels as passive actuators to induce shape morphing in response to environmental temperature changes. In some cases, these hydrogels may be designed to exhibit specific swelling and de-swelling behaviors at different temperatures.

Hydrogels are a group of materials that are capable of swelling (by imbibing large amounts of water) and de-swelling (by expelling large amounts of water) while retaining their basic shape due to chemical (or physical) cross-linking. The hydrogels used in this study were chemically cross-linked by reactions between selected chemical groups and were formulated to reversibly swell and de-swell when exposed to varying water temperatures, thus rendering them temperature sensitive (or temperature responsive).

The variable of particular interest in temperature sensitive hydrogels is the lower critical solution temperature (LCST). This is the temperature below which the hydrogel is predominantly hydrophilic and above which the hydrogel is predominantly hydrophobic. While typical hydrogels exhibit an LCST of around 32° C., the N-tert-butyl acrylamide (NTBAM)-N-isopropyl acrylamide (NIPAM)-acrylamide (AM) copolymer hydrogels were formulated for LCST values of between about 8° C. and 10° C. The NTBAM-NIPAM-AM copolymer hydrogels that were formulated for this study were designed to swell and de-swell at temperatures below and above the LCST, respectively.

To actuate the antenna using an NTBAM-NIPAM-AM copolymer hydrogel, a non-responsive passive elastomer that can form bonds with the hydrogel is required. Polydimethylsiloxane (PDMS) is a commonly used elastomer; however, due to its hydrophobicity, it cannot naturally form bonds with hydrophilic hydrogels. Nevertheless, various surface modification methods such as oxygen plasma treatment or the use of photo-initiators can induce free-radical reactions between PDMS and monomers. Therefore, in this study, a simple mixture of benzophenone and PDMS was used to enable UV-mediated free radical polymerization on the PDMS surface while maintaining the integrity of the hydrogel.

Two types of experiments were conducted, one with the temperature-responsive hydrogels and another with the star pattern and integrated antenna. The hydrogel experiments were performed to assess the amount of actuation that the hydrogel can be expected to impart to the shape morphing geometry. The star pattern (or the substrate) and integrated antenna experiments were done to optimize its shape morphing responsiveness.

Two sets of hydrogels, namely sample set 1 and sample set 2, were fabricated by varying the amount of solvent and cross-linking agent in each set. Each sample set contained three samples. The samples were synthesized by combining three monomers, namely NTBAM (0.525 mmol/mL), NIPAM (0.150 mmol/mL) and AM (0.25 mmol/mL), with two solvents, namely deionized water (4.5 mL for sample set 1 and 1.5 mL for sample set 2) and tert-butanol (7.5 mL for each sample set), and a cross-linking agent, N-N'methylenebisacrylamide (MBA) (3 mL solution for sample set 1 and 6 mL solution for sample set 2). The MBA solution concentration was 1.80 mg/mL for sample set 1 and 3.6 mg/mL for sample set 2. The 15 mL solution of each sample set was mixed in a FlackTek speed mixer and heated to 60° C. Potassium persulfate (KPS) (150 µL) was then added as an initiating agent, and the solution was once again mixed in a FlackTek speed mixer. Following this, 5 mL of solution was pipetted out into each of three cylindrical polypropylene laboratory containers. The six containers were then placed in a vacuum oven at 60° C. for 12 h to allow the samples to cure. Each cured sample resembled a roughly Ø25 mm disc with a nominal thickness of 6 mm. After curing, the hydrogel samples were rinsed in deionized water to remove any unreacted monomers and then placed in fresh deionized water in a refrigerator at approximately 4° C. for a minimum of 24 h, in order to allow equilibrium swelling of the samples.

Figure 4B:
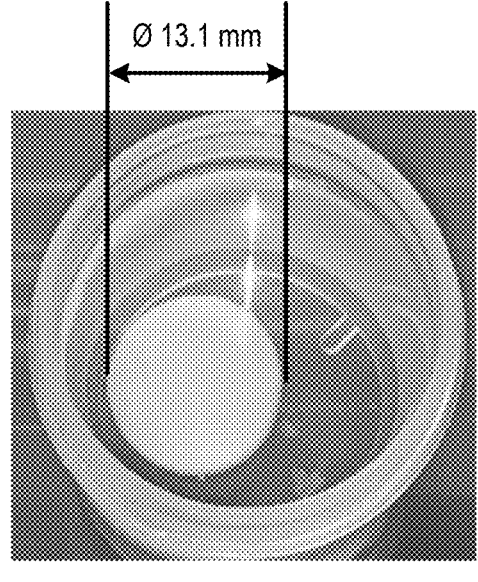
FIGS. 4A and 4B illustrate orthogonal top views of a hydrogel sample in different states, according to some embodiments of the present document.
Figure 4A:
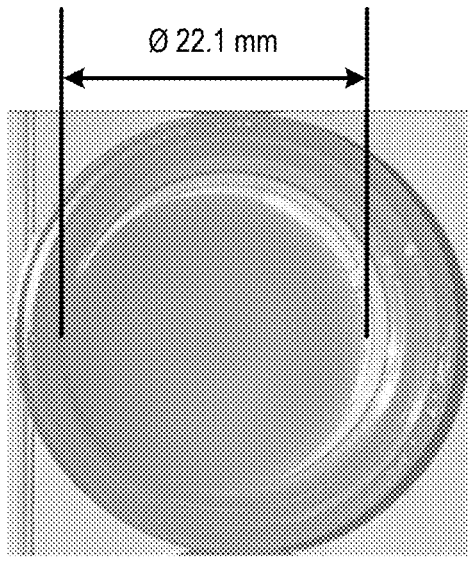

FIG. 4A and FIG. 4B illustrate the temperature-responsive behavior of a hydrogel sample used in the sensor. The two different hydrogel sample sets were placed in deionized water at six test temperature regimes, namely, 4, 6, 8, 13, 15, and 22° C. for 20 min. For each test temperature, the average diameters of the discs were reported for both sample sets via simple photogrammetry from the time of immediate exposure to each test temperature for a total exposure time of 20 min in 2 min increments.

FIG. 4A shows the hydrogel sample in a fully swelled state after soaking for more than 24 hours in approximately 4° C. water. The hydrogel sample appears as a circular disc with a diameter of approximately 22.1 mm. FIG. 4B shows the same hydrogel sample after de-swelling for 20 minutes in 15° C. water. The hydrogel sample has contracted significantly, with the diameter reduced to approximately 13.1 mm. These images demonstrate how exposure to different temperature environments affects the physical dimensions of the hydrogel sample.

The temperature-responsive actuators may be made of N-tert-butyl acrylamide (NTBAM)-N-isopropyl acrylamide (NIPAM)-acrylamide (AM) copolymer hydrogels. In some cases, these copolymer hydrogels may be formulated to have different lower critical solution temperatures (LCST) between 8° C. and 15° C.

Figure 5:
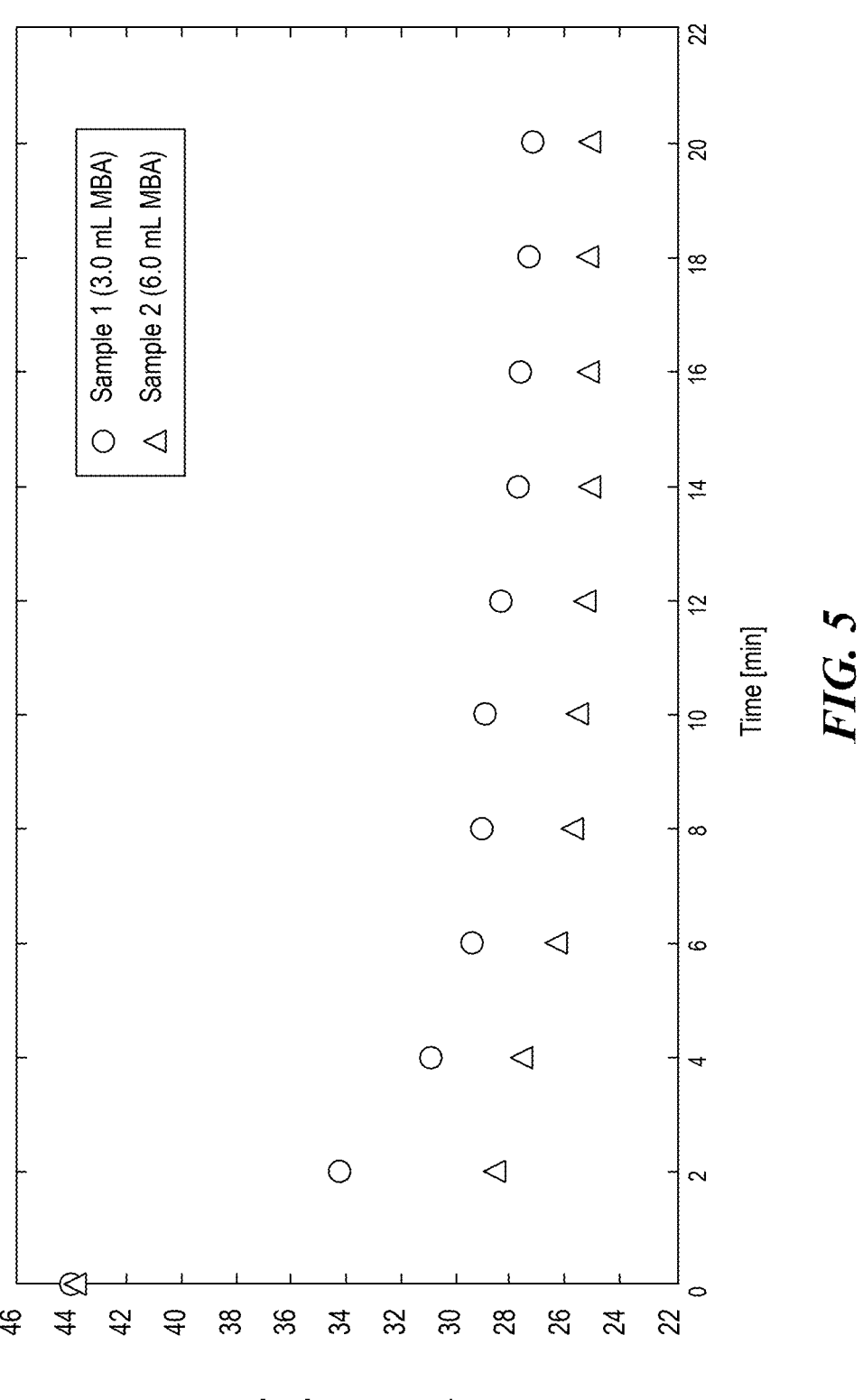
FIG. 5 depicts a graph showing average sample diameter versus time data for two test sample sets, according to some embodiments of the present document.
Figure 6:
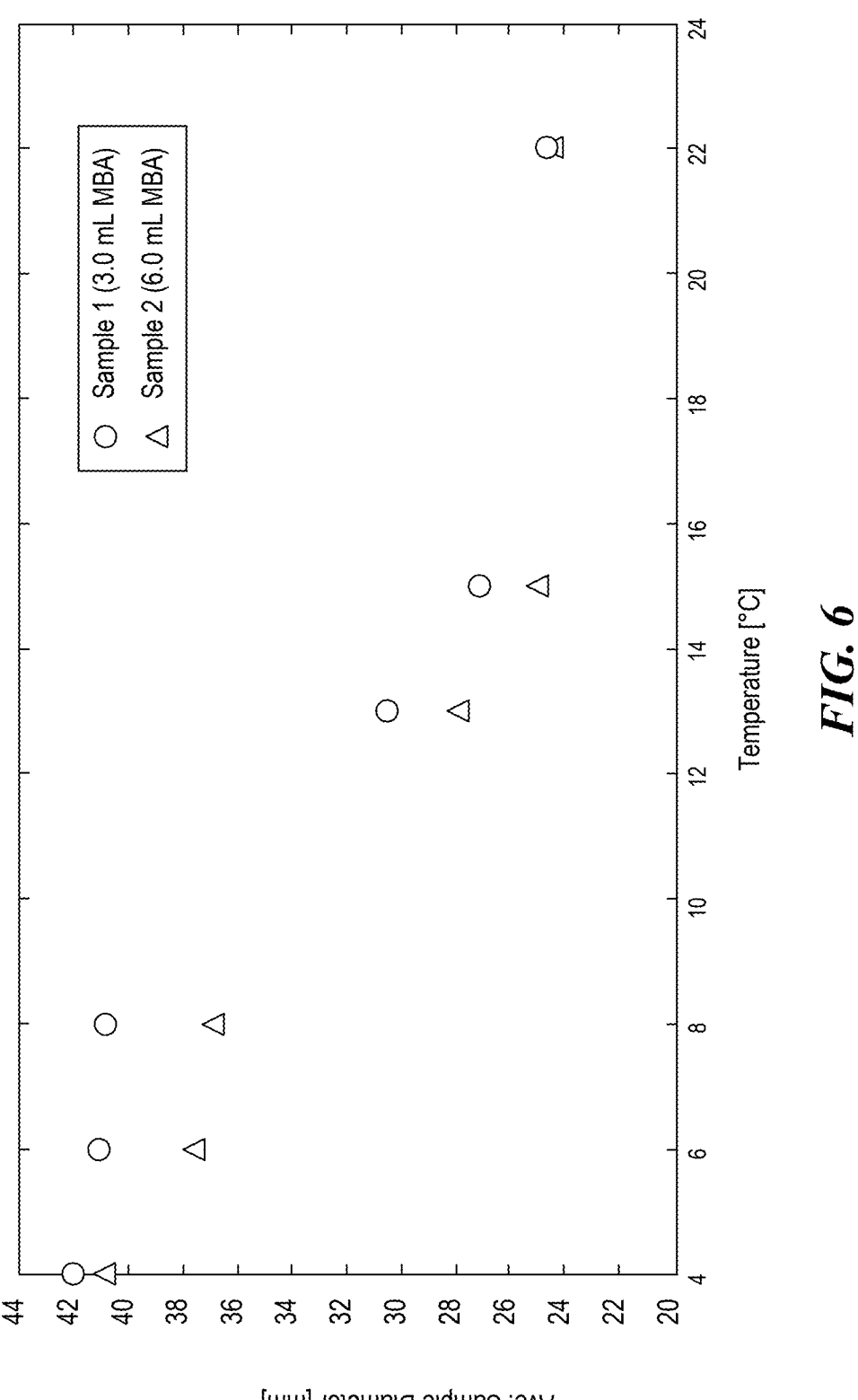
FIG. 6 depicts a graph showing average sample diameter versus temperature data for two hydrogel sample sets, according to some embodiments of the present document.

The synthesized temperature-sensitive hydrogel samples were tested to obtain de-swelling data, which would then be used to actuate the shape morphing BIAS pattern and its integrated antenna. FIGS. 5 and 6 show the results obtained. Each of the two sample sets was exposed to deionized water at 4, 6, 8, 13, 15, and 22° C. for 20 min.

FIG. 5 depicts a graph showing the average sample diameter versus time data for two hydrogel test sample sets exposed to 15° C. water. The diameter versus time data plots for the 4, 6, 8, 13, and 22° C. tests followed the same general pattern as that for the 15° C. shown in FIG. 5. The plots showed a sharp decrease in diameter within approximately 8 to 10 min and then stabilized to a more-or-less constant value from then onwards.

The LCST was estimated, from FIG. 6 to be between 8 and 15° C. The percentage decrease in diameter for each of the two sample sets after 20 min at the two temperatures that were ostensibly above the LCST was 38% for sample set 1 and 42% for sample set at 15° C., and 43% for both sample sets at 22° C. With one hydrogel actuator on each end of the auxetic star pattern, both hydrogel actuators would be easily capable of imposing a 50% strain on the BIAS star pattern when exposed to water.

The swelling and de-swelling behavior of the hydrogel samples may be characterized by the change in their physical dimensions in response to temperature variations. In some cases, the hydrogel samples may maintain their circular disc shape during the de-swelling process, though the overall size may be reduced. The rate and extent of de-swelling may vary depending on the composition of the hydrogel and the temperature of the surrounding environment.

The temperature-responsive behavior of these hydrogel samples may be leveraged in the passive wireless mechanical metamaterial sensor to induce mechanical strain in the star pattern structure when exposed to different temperature environments. This strain may cause the star pattern to transform from a two-dimensional to a three-dimensional configuration, resulting in changes to the embedded antenna geometry and corresponding variations in its electromagnetic signature.

A tensile test sample was prepared following ASTM D638 type IV to obtain hyperelastic material parameters for PDMS, which can be used in finite element simulations, since the BIAS star geometry for the passive antenna was created using PDMS. The PDMS base material was prepared by adding 1.8 wt % benzophenone to reduce their hydrophobicity. The benzophenone, which is solid at room temperature, was liquefied at around 80° C. before being added to the PDMS and then mixed using a Flacktek speed mixer at 3,000 rpm for 2 min. Afterwards, 5 wt % PDMS crosslinker was added and mixed for 5 min at 1,000 rpm to prepare the PDMS prepolymer. The prepared prepolymer was transferred into a syringe, then centrifuged at 3,000 rpm for 20 min to remove all air, before being used for casting. The casting mold for each tensile specimen and BIAS star geometry was designed using Fusion 360 and then 3D-printed using thermoplastic urethane (TPU) using an Ultimaker 3+ fused deposition modeling printer. A layer of petrolatum was applied to the mold to prevent the cured PDMS from sticking to the mold for ease of demolding. The PDMS prepolymer was then deposited in the mold and cured at 80° C. for 1 h. Each PDMS tensile coupon was subjected to uniaxial tension using a Test Resource 150R load frame. The testing rate was set at 1 mm/s, and the test continued until the specimen fractured.

Experimentally calibrated finite element (FE) simulations using COMSOL Multiphysics were created to determine the optimal width of the BIAS geometry for inducing 3D deformations. However, properties of the PDMS substrate were needed to define the COMSOL hyperelastic numerical model. Therefore, the tensile test load-displacement data of PDMS was converted to stress-stretch and fitted using nonlinear least-square regression to obtain the five Mooney-Rivlin parameters. The first Piola-Kirchoff stress can be expressed below, assuming the material is incompressible.

$$P = 2(1 - \lambda^{-3})(\lambda C_{10} + 2C_{20}\lambda(I_{1_{uni}} - 3) + \tag{1}$$
$$C_{11}\lambda(I_{2_{uni}} - 3) + C_{01} + 2C_{02}(I_{2_{uni}} - 3) + C_{11}(I_{1_{uni}} - 3))$$

The five Mooney-Rivlin parameters are listed in Table I and were used for parametric optimization in COMSOL Multiphysics. One end of the BIAS star geometry was fixed, and uniaxial tension was applied to the opposite end to induce a 50% strain in the star geometry. The load-displacement behavior of each geometry was captured during this process.

TABLE I

| MOONEY-RIVLIN PARAMETERS OF PDMS | | | | | |
|---|---|---|---|---|---|
| $C_{10}$ [MPa] | $C_{01}$ [MPa] | $C_{11}$ [MPa] | $C_{20}$ [MPa] | $C_{02}$ [MPa] | P [kg/m³] |
| 0.023 | 0.035 | −0.149 | 0.047 | 0.142 | 965 |

Figure 7:
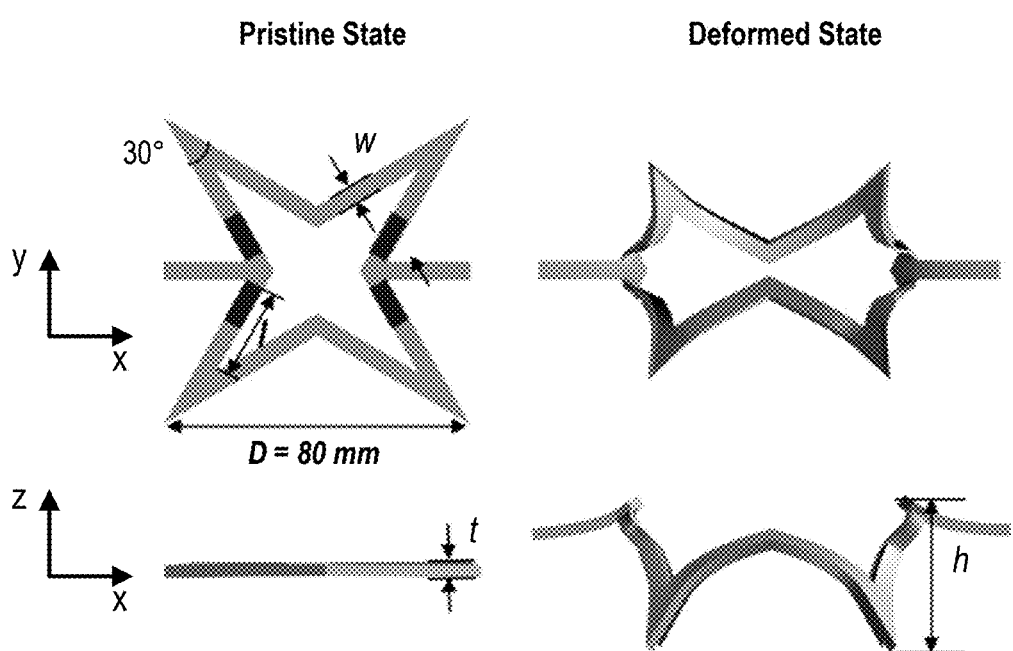
FIG. 7 illustrates orthogonal views of a star-shaped pattern in pristine and deformed states, according to some embodiments of the present document.

FE simulations were performed to identify the optimal width (w) that promoted 3D deformations or shape morphing of the BIAS star geometry. FIG. 7 shows the top and side views of both the pristine and deformed states of a BIAS star geometry, along with the dimensions used in the FE model. The outer tip spacing (D), rib angle, and thickness w were fixed at 80 mm, 30°, and 3 mm, respectively. The 30° rib angle was formed at the tip of the arm of the star pattern, where two edges of the arm meet to form a point. When uniaxial strain was applied to the BIAS star geometry, localized compression was induced on the beam between the inner and outer tips. Buckling occurred when this compression exceeded the critical buckling force of the beam. When the width was greater than the thickness, buckling occurred in the out-of-plane direction, allowing for 3D deformations to occur. When the length of the notch applied to the beam exceeded 50% (shaded region in FIG. 7), buckling orientation in the opposite direction may be controlled (downwards in FIG. 7) of the indented surface. Therefore, notches with a length of 50% of the beam's length and a depth of ⅔ of the thickness were always created, followed by parametric optimization with respect to w.

The out-of-plane buckling instability of the BIAS star geometry was inversely proportional to w. When the BIAS star geometry was stretched, the outer and inner tips move in the out-of-plane direction. The distance between these tips is referred to as h (see FIGS. 7 and 11), the depth of the notch. As it strained, h gradually increased, reached a maximum, and then decreased again. The point of reaching the maximum value is known as full deployment.

Figure 8A:
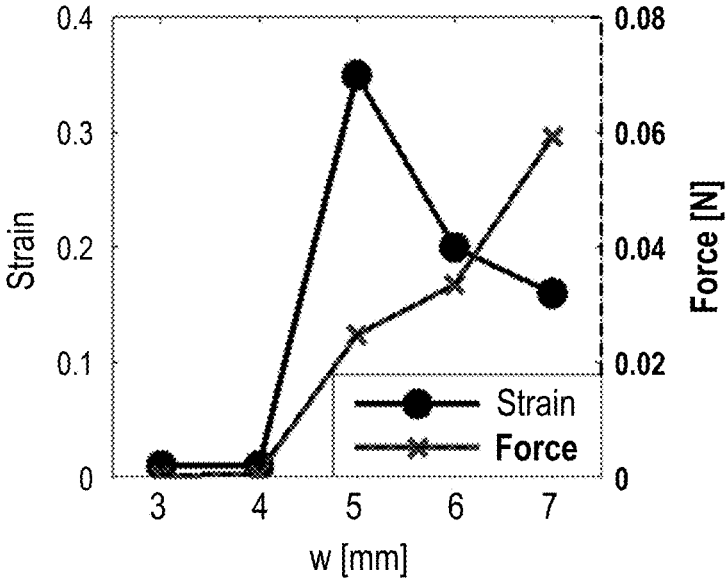
FIGS. 8A-8B depict a graph showing the relationship between width, strain, and force, according to some embodiments of the present document.
Figure 8B:
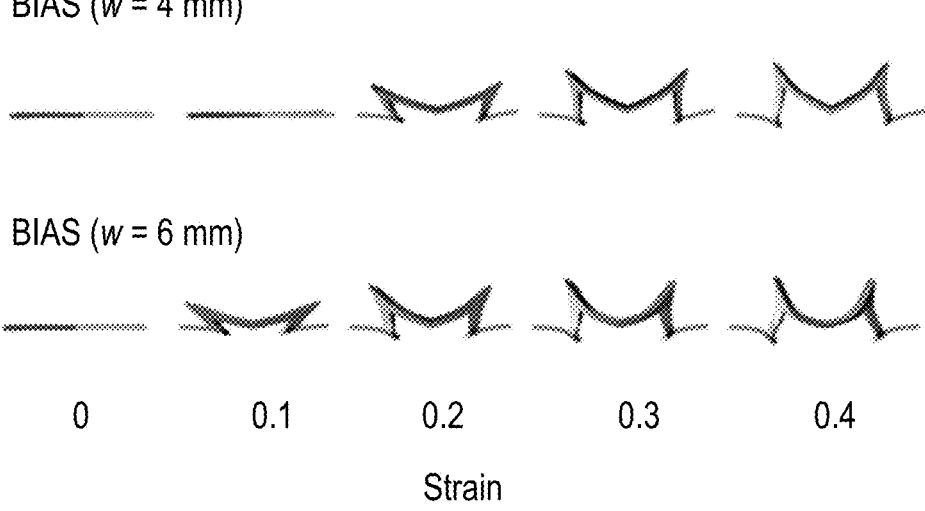

FIG. 8A displays the strain and stress needed for BIAS star geometry to reach full deployment. Geometries with the thickness of the wall of an arm of the star pattern w=3 and 4 mm did not reach full deployment at 50% strain. However, geometries with w=5 to 7 mm reached full deployment within 40% strain. The required strain decreased as w increased, while BIAS star geometries with a wider w required greater forces because of their higher stiffness. In addition, FIG. 8B illustrates the deployment of BIAS geometries with w=4 and 6 mm as a function of strain. BIAS with a wider w achieved full deployment and experienced out-of-plane deformation at a lower strain. Although all BIAS star geometries with w ranging from 5 to 7 mm shape morphed at below 40% strain, the geometry with w=6 mm, which demanded relatively lower strain and force, was identified as the most optimal geometry for the antenna under the tested configuration.

In some implementations, one or more geometries of the star pattern of the substrate including, e.g., the rib angle (or angle for brevity), h, w, thickness (t) of the pattern (see, e.g., FIG. 7), outer tip spacing (D) (see, e.g., FIG. 7), or the like, or a combination thereof, of the star pattern arms, may be adjusted to improve its shape-morphing capabilities for specific use cases based on various factors related to the specific application and desired sensor performance.

With reference to the rib angle for illustration, the angle may be selected or optimized based on one or more factors including, e.g., the star pattern material, antenna design characteristics, and the environmental parameters to be detected.

For example, in applications taking higher sensitivity to small temperature changes, the rib angle may be modified to amplify the deformation response. Conversely, for environments with more extreme temperature fluctuations, the angle may be adjusted to provide a more gradual shape-morphing behavior over a wider range.

As another example, the choice of angle may also influence the antenna's electromagnetic properties. Different rib angles may result in varying antenna geometries as the star pattern deforms, potentially affecting parameters such as resonant frequency, radiation pattern, and impedance matching. By tuning the rib angle, the sensor's wireless communication capabilities may be optimized for specific frequency bands or transmission ranges.

As a further example, environmental factors such as humidity, salinity, or mechanical stress may also impact the selection of the optimal rib angle. The angle may be tailored to enhance the sensor's response to particular stimuli while minimizing interference from others. For instance, in marine applications, the rib angle may be designed to maximize sensitivity to immersion time (or immersion duration, the duration of immersion in seawater), while maintaining structural integrity in high-salinity environments. Higher salinity environments may affect the mechanical properties of the sensor materials over time. The rib angle may be selected to maintain structural stability and consistent shape-morphing behavior in high-salinity conditions.

By considering these factors, the rib angle may be tailored to enhance the sensor's overall performance and reliability in marine environments with varying salinity levels. The specific relationship between angle and salinity may depend on the particular sensor design, materials used, and intended application.

Additionally, the rib angle may be adjusted to accommodate different types of stimuli-responsive materials or actuation mechanisms. Hydrogels with varying swelling behaviors or shape memory alloys with different transformation characteristics may require specific rib angles to achieve the desired shape-morphing performance.

In some cases, the star pattern may incorporate multiple arm segments with different angles, allowing for more complex deformation behaviors and enabling the sensor to respond to multiple environmental parameters simultaneously. This multi-angle approach may provide greater versatility in sensor applications across diverse environments.

Figure 9:
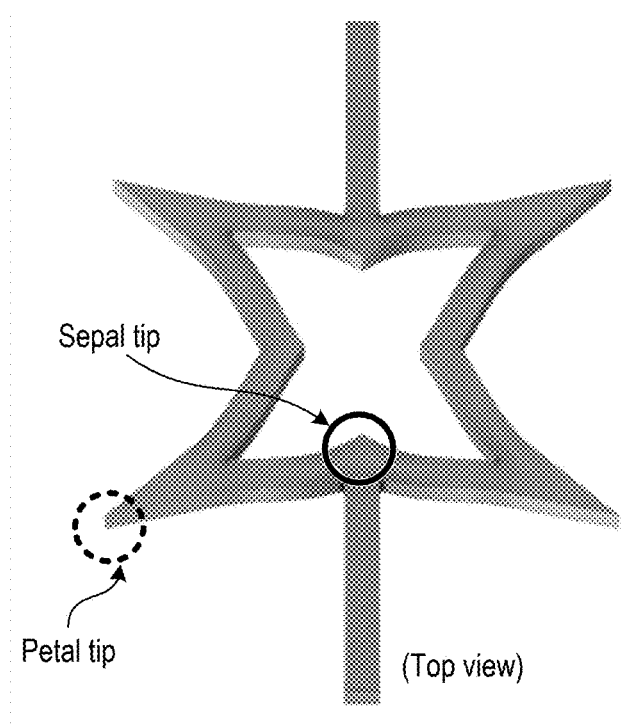
FIG. 9 illustrates a top view and side view of an auxetic geometry pattern, according to some embodiments of the present document.
Figure 9:
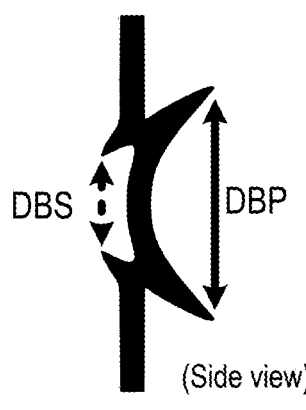

FIG. 9 provides additional insight into the auxetic geometry of the star pattern. The figure shows how the pattern may include sepal tips and petal tips, which contribute to its unique deformation characteristics. The auxetic nature of the geometry may enable the structure to exhibit negative Poisson's ratio behavior, where the pattern expands laterally when stretched longitudinally. In FIG. 9, DBS and DBP stand for Distance Between Sepals and Distance Between Petals, respectively.

Figure 10:
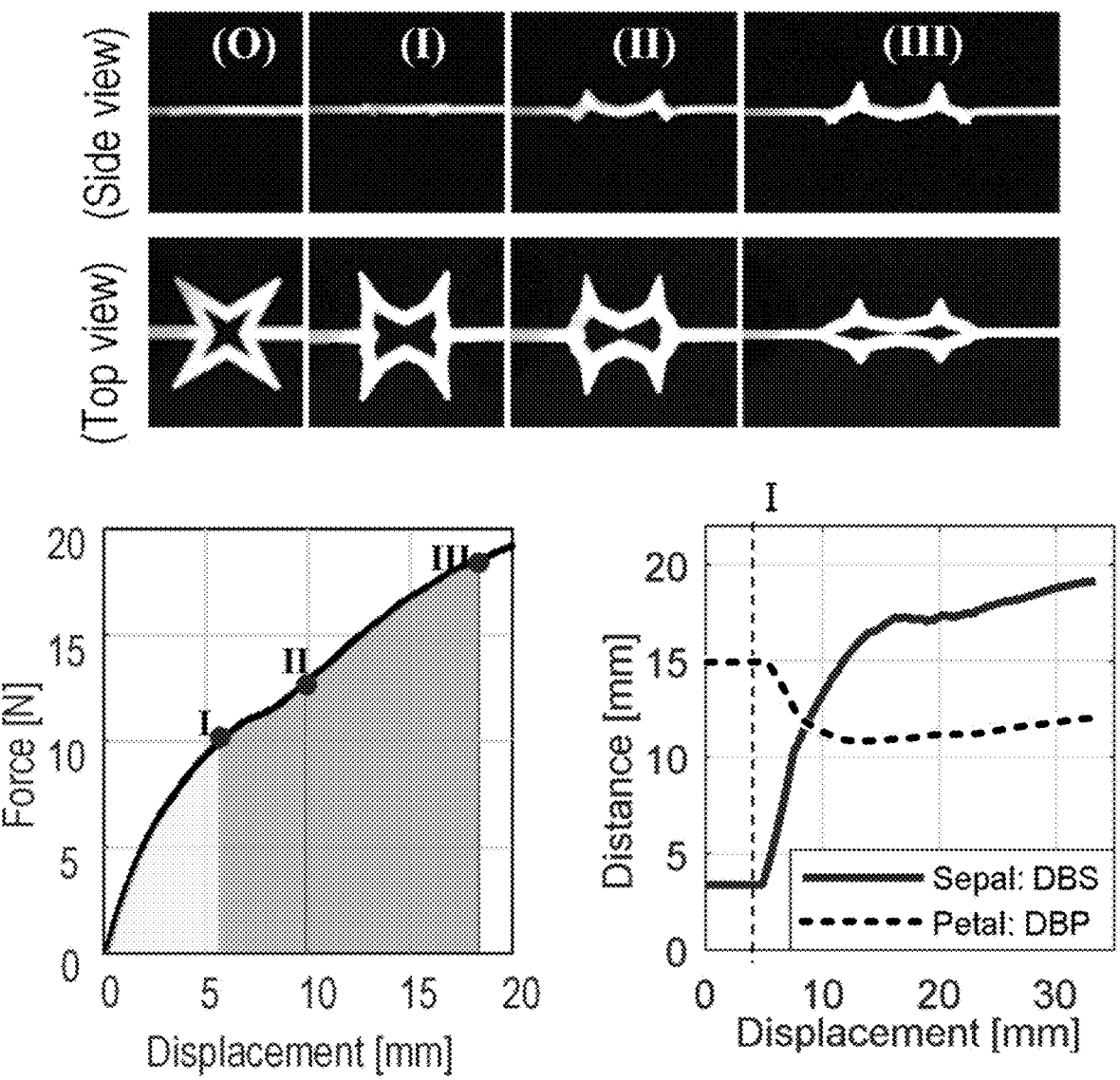
FIG. 10 depicts a graph showing force versus displacement measurements for a shape-morphing star pattern structure, according to some embodiments of the present document.

The shape-morphing behavior of the star pattern may be further analyzed through force-displacement measurements. FIG. 10 presents a graph showing the non-linear relationship between applied force and displacement during deformation. The figure includes corresponding side view and top view images illustrating the progressive shape transformation of the star pattern at different stages of deformation.

Figure 11:
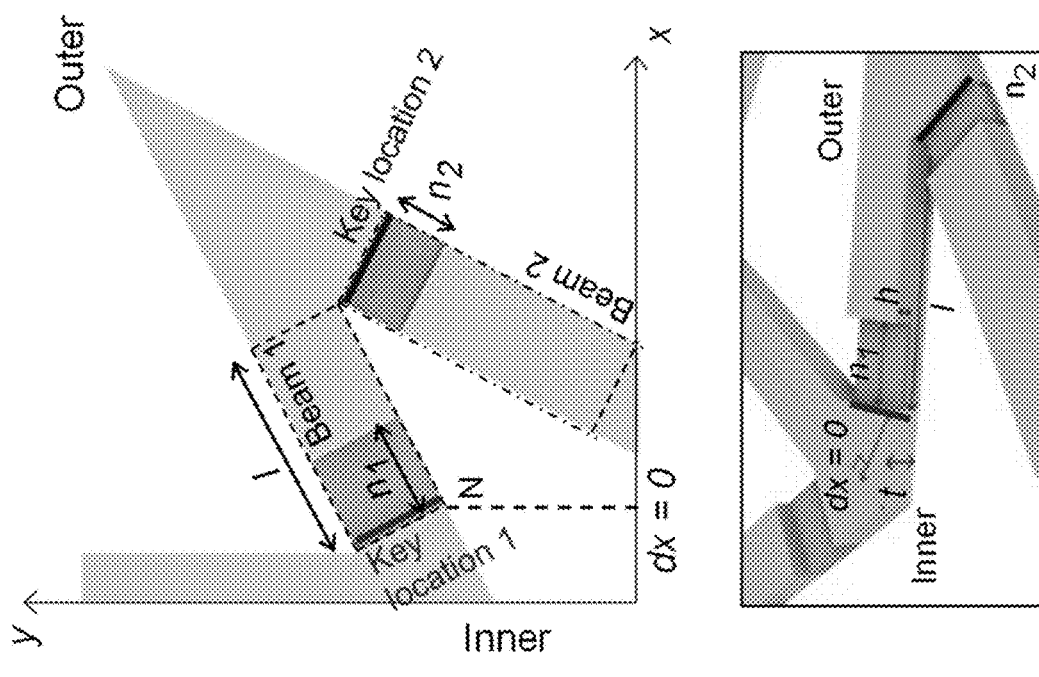
FIG. 11 depicts a graph showing parametric optimization data for a star pattern geometry, according to some embodiments of the present document.
Figure 11:
Figure 11:
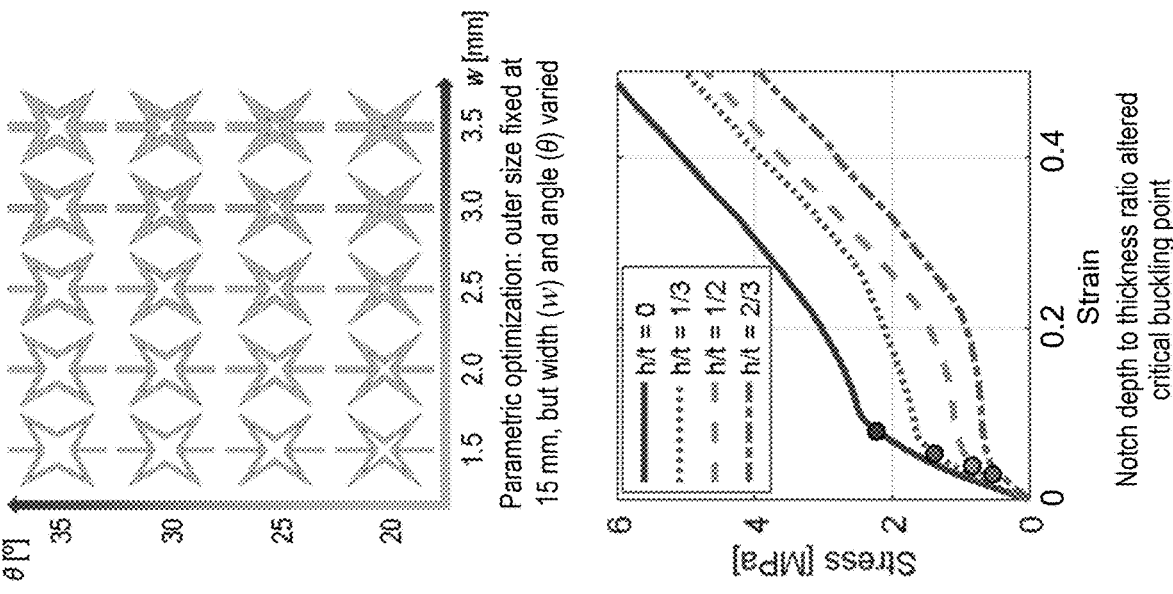

FIG. 11 depicts a graph showing parametric optimization data for the star pattern geometry. The graph presents the relationship between outer size and angle, with data points arranged in a grid pattern. This optimization process may help identify the most effective combinations of geometric parameters for achieving desired shape-morphing behavior.

Figure 12:
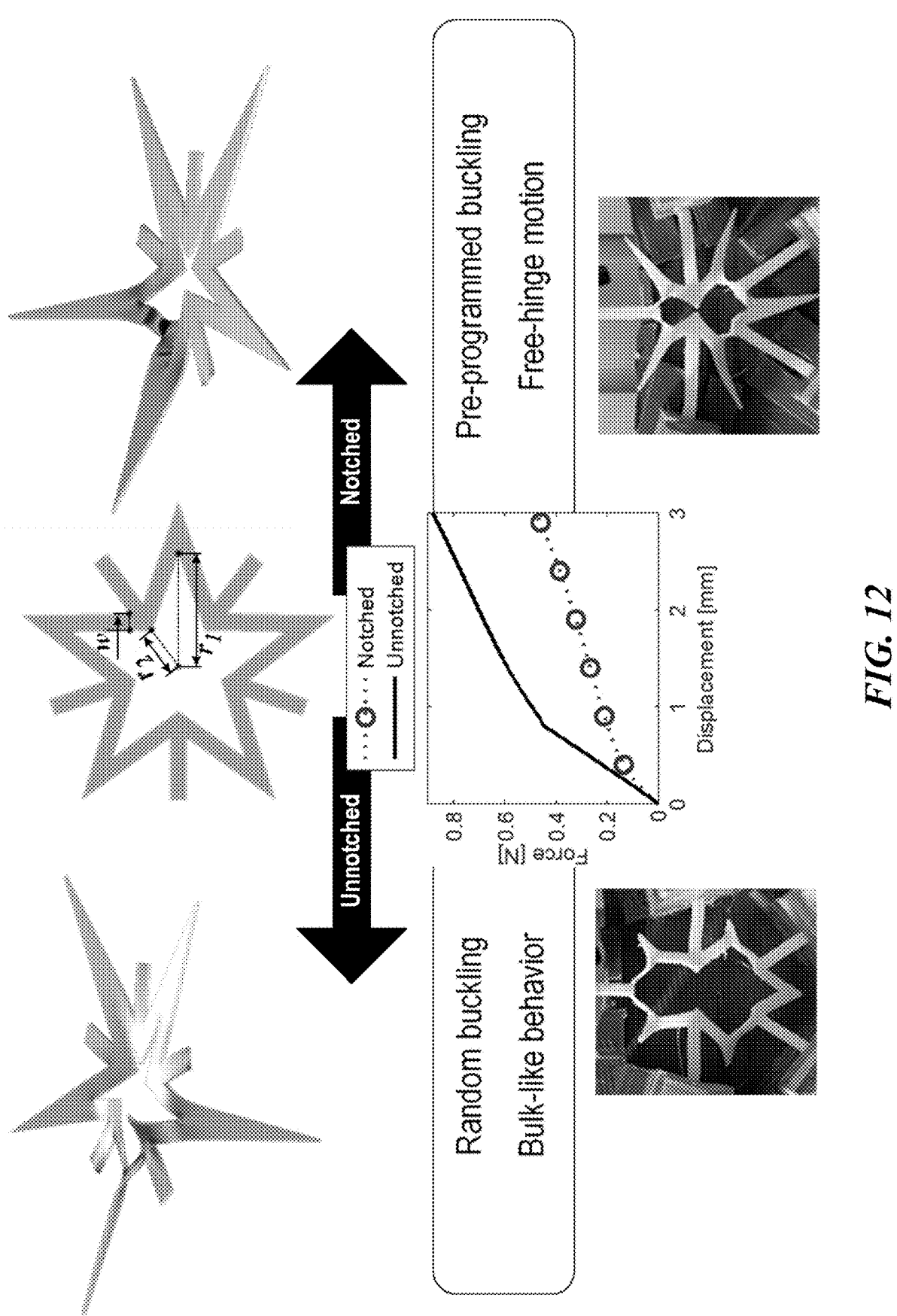
FIG. 12 illustrates a shape morphing sequence of an auxetic star pattern structure, according to some embodiments of the present document.

In some cases, the star pattern may be designed with different numbers of points. FIG. 12 illustrates a shape morphing sequence of an auxetic star pattern structure with multiple points. The figure demonstrates how the pattern may transform from an unnotched state through a planar configuration to a pre-programmed buckling state.

The geometric design of the star pattern may incorporate artificial imperfections, such as notches, to control the buckling behavior. These intentional design features may allow for more precise control over the shape-morphing process, enabling the structure to achieve specific three-dimensional configurations in response to applied forces.

By adjusting the geometric parameters of the star pattern, including the number of points, rib angles, arm widths, and intentional imperfections, the shape-morphing behavior of the structure may be tailored for specific applications. This geometric optimization may enable the development of passive wireless mechanical metamaterial sensors with predictable and controllable deformation characteristics.

Figure 13:
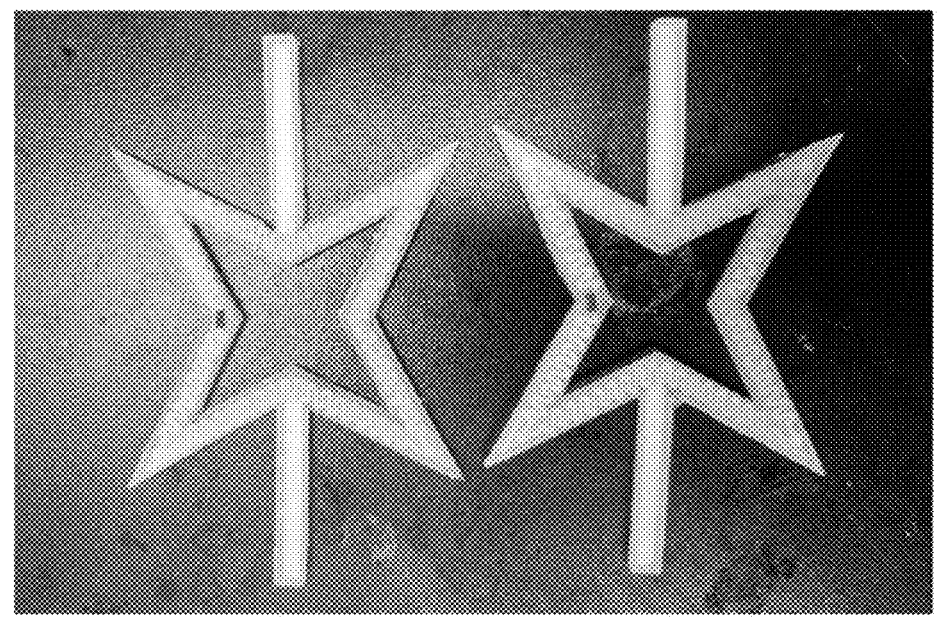
FIG. 13 depicts graphs showing phase and received signal strength measurements over time for a wireless sensor, according to some embodiments of the present document.
Figure 13:
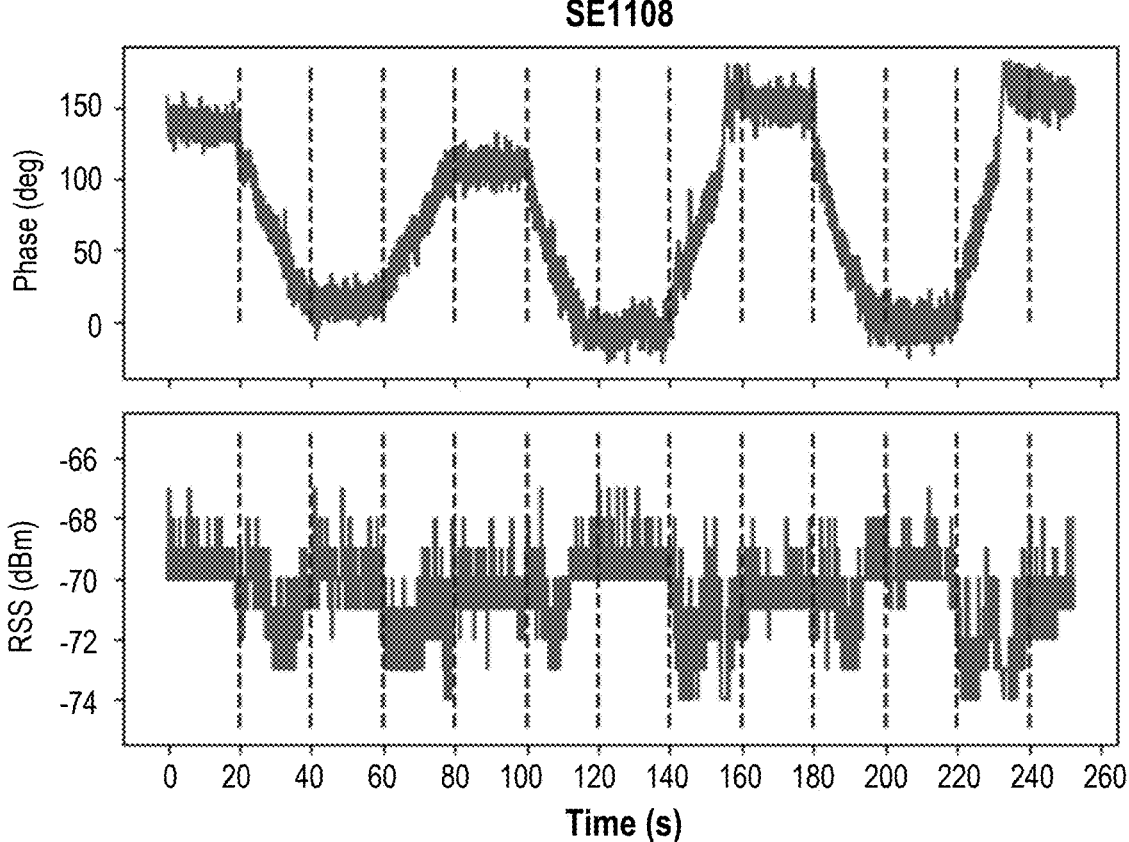

The passive wireless mechanical metamaterial sensor may incorporate wireless sensing capabilities to enable remote interrogation and monitoring of environmental conditions. FIG. 13 depicts two graphs showing phase and received signal strength (RSS) measurements over time for the wireless sensor. The upper graph illustrates phase measurements in degrees that oscillate between approximately 0 and 150 degrees over multiple cycles spanning about 260 seconds. The lower graph displays RSS measurements in dBm that fluctuate between approximately −66 and −74 dBm over the same time period.

In some cases, the phase and RSS measurements may correspond to different shape-morphing states of the sensor. As the star pattern geometry transforms in response to environmental stimuli, the embedded antenna's configuration may change, resulting in detectable variations in the wireless signal characteristics. The oscillating pattern observed in the phase measurements may indicate cyclic deformation of the sensor structure, while the fluctuations in RSS may reflect changes in the antenna's radiation efficiency or orientation relative to the reader.

Figure 14:
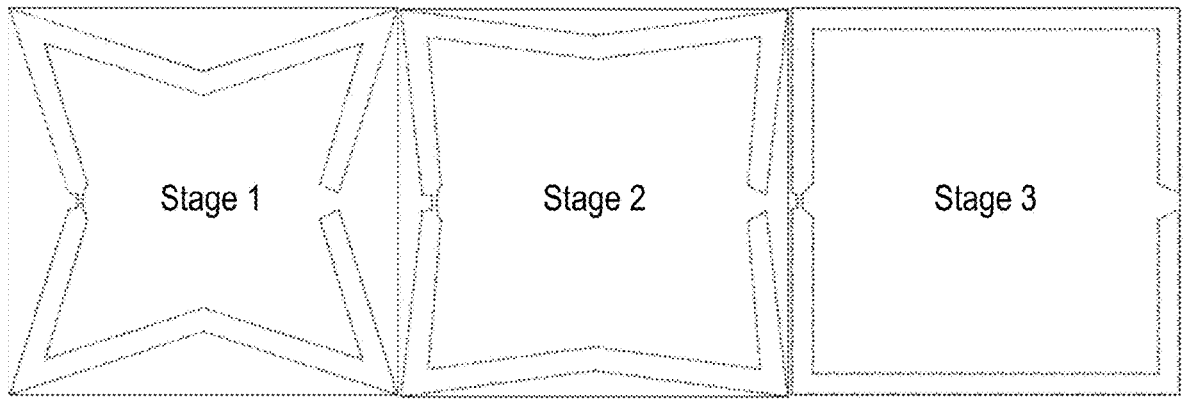
FIG. 14 depicts a graph showing the relationship between stages and distance measurements, according to some embodiments of the present document.
Figure 14:
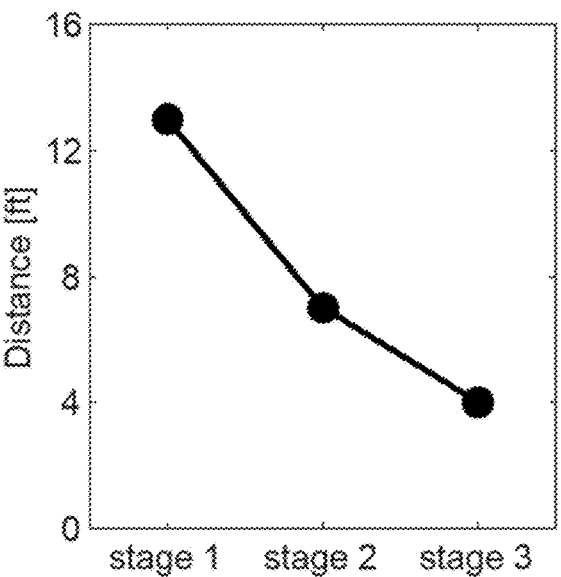

FIG. 14 presents a graph showing the relationship between different stages of sensor deformation and the maximum readable distance. The graph includes three data points connected by a solid line, with the x-axis labeled "stage 1", "stage 2", and "stage 3", and the y-axis showing distance measurements in feet. The line shows a decreasing trend from approximately 13 feet at stage 1, to 7 feet at stage 2, and finally to 4 feet at stage 3.

This relationship between deformation stages and readable distance may provide insights into how the sensor's shape-morphing behavior affects its wireless communication range. As the sensor undergoes more pronounced deformation, the maximum distance at which the sensor can be reliably interrogated may decrease. This information may be valuable for optimizing reader placement and determining the effective range of the sensor system in various environmental conditions.

Figure 15:
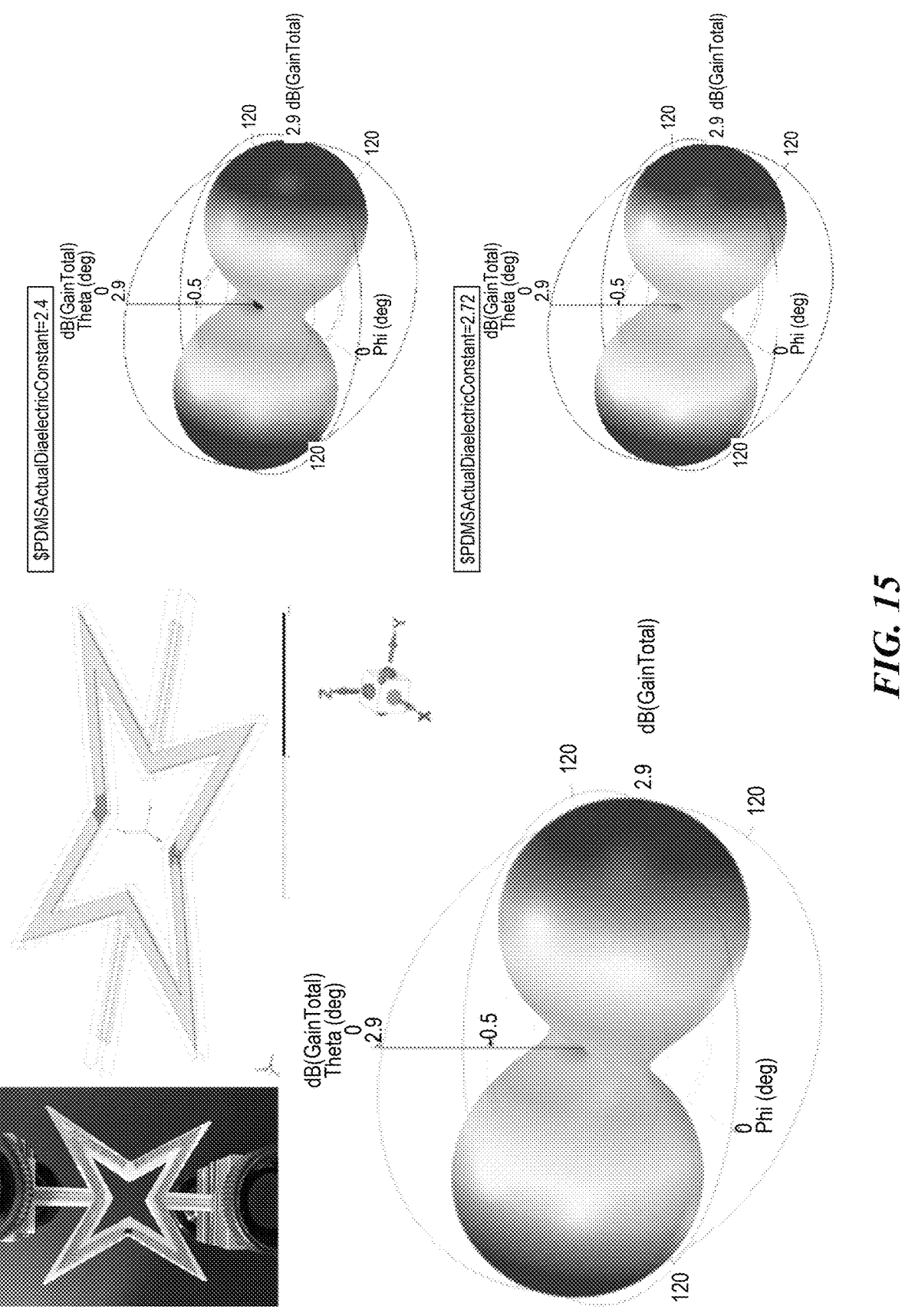
FIG. 15 illustrates radiation pattern diagrams for an antenna design integrated with a shape-morphing star pattern structure, according to some embodiments of the present document.

The antenna performance of the passive wireless mechanical metamaterial sensor may be characterized by its radiation pattern. FIG. 15 illustrates radiation pattern diagrams for the antenna design integrated with the shape-morphing star pattern structure. The figure includes three diagrams showing antenna radiation characteristics at different configurations.

Each diagram depicts a figure-eight shaped radiation pattern with angular measurements marked at 120-degree intervals around the perimeter. The diagrams include gain measurements indicated in decibels (dB) and show phase angle (Phi) measurements. The radiation patterns demonstrate how the antenna's electromagnetic properties may vary based on the geometric configuration of the star pattern structure.

In some cases, the embedded antenna may be optimized to operate at approximately 900 MHz. This frequency range may be selected to balance factors such as signal penetration, antenna size, and compatibility with existing RFID systems. The optimization process may involve adjusting the antenna geometry, materials, and integration with the star pattern structure to achieve desired performance characteristics at the target frequency.

The radiation pattern diagrams may provide quantitative data regarding the directionality and strength of the antenna's radiation pattern. The symmetrical lobes characteristic of dipole-type antenna configurations may be observed, with the radiation intensity varying according to the angular position relative to the antenna structure. As the star pattern undergoes shape morphing, these radiation patterns may change, potentially altering the sensor's wireless communication capabilities in different directions.

By analyzing the antenna's radiation patterns at various stages of deformation, the sensor's performance may be optimized for specific applications. For example, the antenna design may be tailored to maintain consistent signal strength in certain directions while allowing for detectable variations in others, enabling more precise monitoring of environmental conditions through wireless interrogation.

Figure 16:
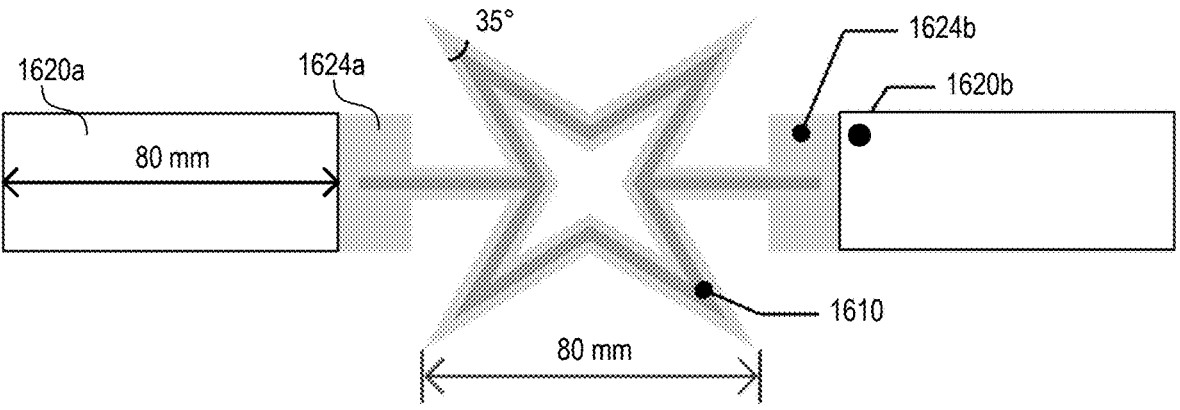
FIG. 16 shows orthogonal side views illustrating temperature-responsive behavior of a passive wireless mechanical metamaterial sensor, according to some embodiments of the present document.
Figure 16:
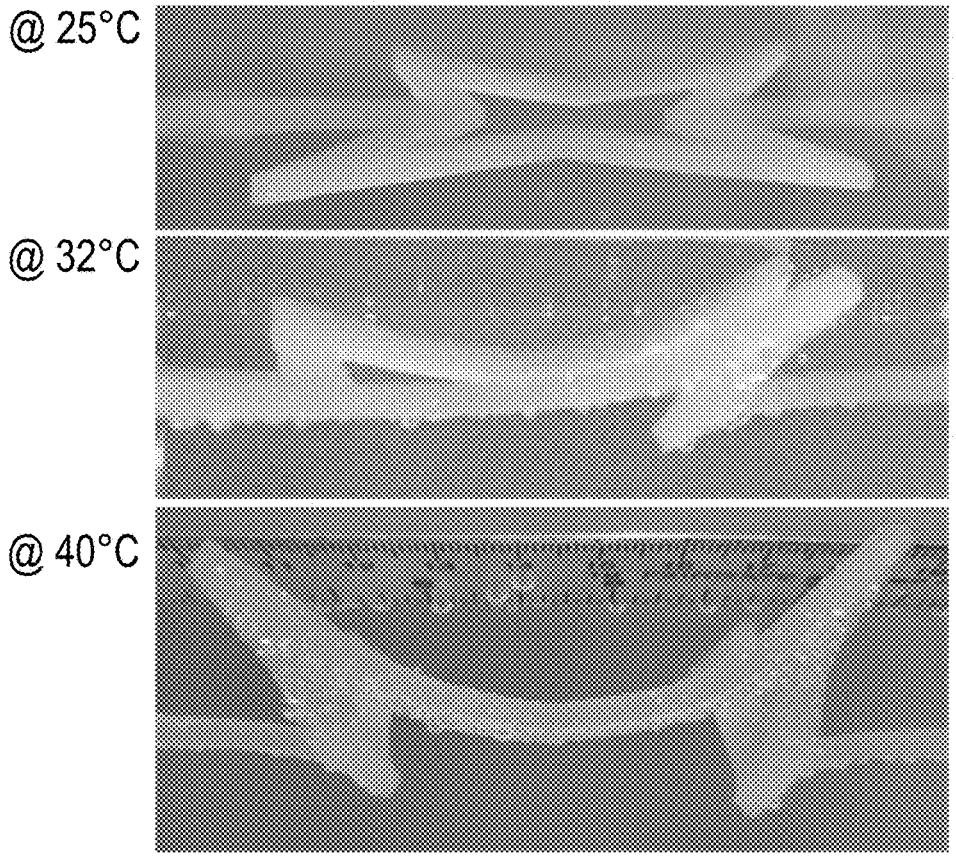

The passive wireless mechanical metamaterial sensor may exhibit temperature-induced shape morphing and respond to water immersion. FIG. 16 illustrates a series of orthogonal side views showing the temperature-responsive behavior of the sensor at different temperatures.

The sensor may include a star pattern skeleton 1610 that provides the basic structural framework. A first stimuli responsive polymer 1620*a* and a second stimuli responsive polymer 1620*b* may be positioned at opposite ends of the star pattern skeleton 1610. The first stimuli responsive polymer 1620*a* and the second stimuli responsive polymer 1620*b* may be secured in place using a first elastomer anchor 1624*a* and a second elastomer anchor 1624*b*, respectively.

At 25° C., the sensor may maintain a substantially planar configuration where the star pattern skeleton 1610 retains its original shape with the first stimuli responsive polymer 1620*a*, the second stimuli responsive polymer 1620*b*, the first elastomer anchor 1624*a*, and the second elastomer anchor 1624*b* positioned at the ends.

As the temperature increases to 32° C., the sensor may begin to deform. The first stimuli responsive polymer 1620*a* and the second stimuli responsive polymer 1620*b* may respond to the temperature change, causing the star pattern skeleton 1610 to exhibit out-of-plane deformation.

At 40° C., the sensor may display a more pronounced deformed state. The star pattern skeleton 1610 may exhibit increased curvature due to the temperature-induced response of the first stimuli responsive polymer 1620*a* and the second stimuli responsive polymer 1620*b*, while remaining secured by the first elastomer anchor 1624*a* and the second elastomer anchor 1624*b*.

The views in FIG. 16 demonstrate how the sensor's shape may transform from a planar configuration to a three-dimensional geometry as temperature increases from 25° C. to 40° C. This temperature-induced shape morphing may cause changes in the configuration of the embedded antenna, potentially altering its electromagnetic signature.

Figure 17:
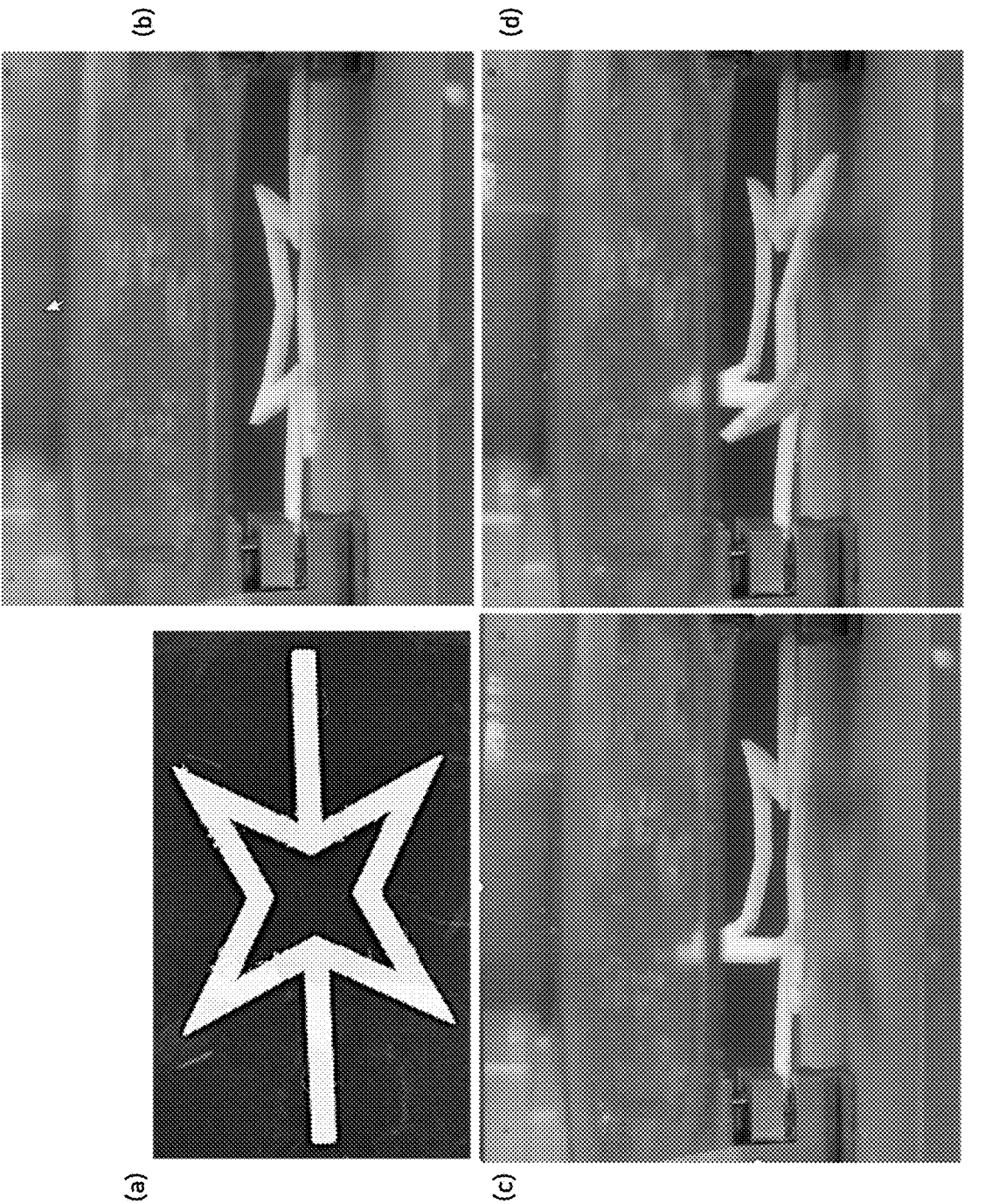
FIG. 17 illustrates a sequence of images showing shape morphing behavior of a star-pattern sensor when immersed in water, according to some embodiments of the present document.

FIG. 17 illustrates the sensor's response to water immersion over time. The figure shows a sequence of three images demonstrating the shape morphing behavior of the star pattern when immersed in water.

Initially, as shown in (a), the star pattern may appear relatively flat. As time progresses, portions of the star pattern may begin to bend and deform out of plane, creating a three-dimensional configuration, as shown in (b)-(d). The sequential images capture the gradual transformation from a two-dimensional to three-dimensional state.

The soluble notch filler in the star pattern may play a role in this water-induced shape morphing. In some cases, the soluble notch filler may have different dimensions or material chemistry to control its dissolution rate. This controlled dissolution may enable specific portions of the star pattern to deform at different times based on the dissolution of the soluble notch filler incorporated into the structure.

For example, a larger volume of soluble notch filler may take longer to dissolve completely, delaying the deformation of that portion of the star pattern. Conversely, a smaller volume may dissolve more quickly, allowing for earlier deformation. The material chemistry of the soluble notch filler may also be adjusted to control its dissolution rate in water, providing another means of tuning the sensor's response to immersion.

This sequential actuation may enable the sensor to provide information about immersion duration through its changing three-dimensional configuration. As different portions of the star pattern deform over time, the embedded antenna's geometry may change correspondingly, potentially resulting in detectable variations in its electromagnetic signature when interrogated by a remote reader.

The combination of temperature-induced shape morphing and water immersion response may allow the sensor to communicate multiple types of environmental information passively. The sensor's ability to change shape in response to both temperature and water exposure may provide a means of monitoring both the temperature of the surrounding environment and the duration of water immersion without requiring active power sources.

Figure 18:
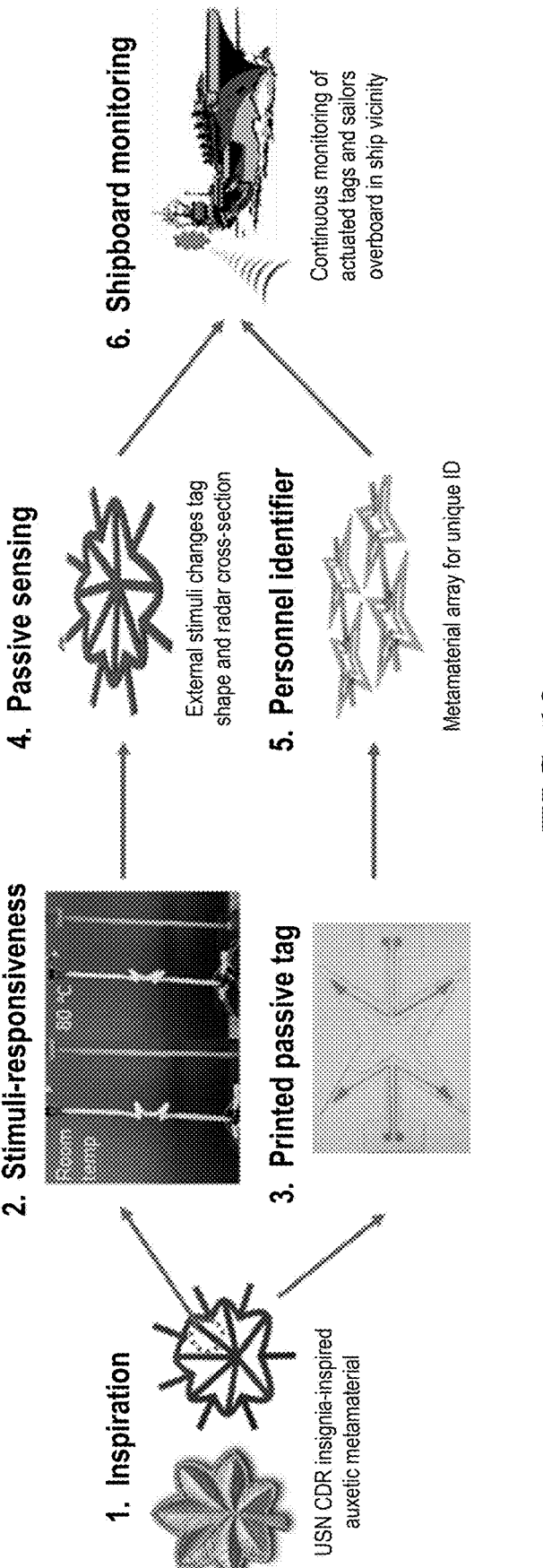
FIG. 18 illustrates a system diagram showing stages of development for a temperature-responsive and passive wireless mechanical metamaterial sensor system, according to some embodiments of the present document.

The development and implementation of the temperature-responsive and passive wireless mechanical metamaterial sensor system may involve several stages, as illustrated in FIG. 18. The system development may progress from initial inspiration through implementation of shipboard monitoring capabilities.

The process may include an initial stage focused on metamaterial pattern design. This initial design phase may involve conceptualizing and creating the basic structure of the star-shaped pattern that forms the foundation of the sensor.

From this initial design, two parallel development paths may emerge. One path may focus on stimuli-responsiveness characterization, while the other may concentrate on printed passive tag development.

The stimuli-responsiveness path may involve room temperature characterization of the metamaterial pattern. This characterization process may help understand how the star pattern behaves under various environmental conditions at ambient temperatures. The insights gained from this characterization may inform the development of a printed passive tag incorporating the characterized design.

In parallel, the passive sensing path may progress to incorporate external stimuli changes in shape and radar cross-section measurements. This development stage may involve testing how the sensor responds to different environmental inputs and how these responses affect its electromagnetic properties.

A personnel identifier component may be integrated into the system, providing unique identification capabilities through a metamaterial array. This feature may allow the sensor to not only detect environmental conditions but also associate those conditions with specific individuals.

These development paths may converge in shipboard monitoring functionality, enabling continuous monitoring of actuated tags and sailors aboard ship. The integration of these components may result in a comprehensive system capable of wirelessly monitoring personnel and environmental conditions in maritime settings.

The substrate or the star pattern, which forms the core of the sensor design, may be fabricated using 3D printing techniques. In some cases, 3D printing may allow for precise control over the geometry and dimensions of the star pattern, enabling the creation of complex structures with specific mechanical properties. The use of 3D printing may facilitate rapid prototyping and iteration of the sensor design, potentially accelerating the development process.

The overall system development approach may be systematic, showing how individual components and capabilities are integrated to create a complete monitoring system. This progression from basic pattern design through full implementation of sensing and identification capabilities may result in a passive wireless mechanical metamaterial sensor system capable of providing desirable information for maritime safety applications.

Figure 19:
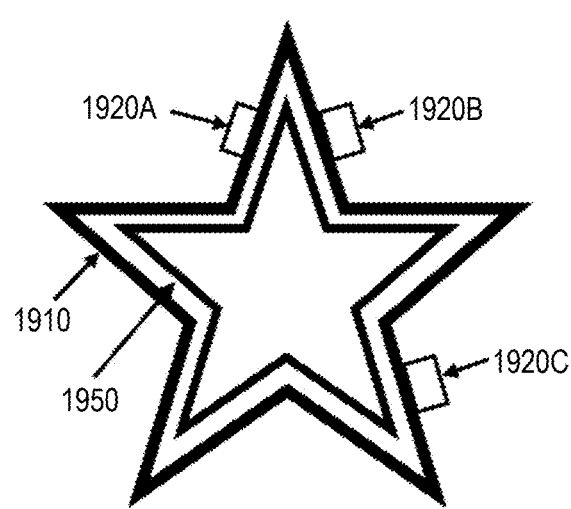
FIG. 19 illustrates a passive environmental sensor, according to some embodiments of the present document.

FIG. 19 illustrates a passive environmental sensor according to some embodiments of the present disclosure. The passive environmental sensor 1900 includes a deformable substrate 1910 having a star-shaped pattern. The components of the sensor 1900 may be the same as or similar to those described elsewhere in the specification, but adapted for broader environmental sensing applications beyond maritime environments.

The deformable substrate 1910 includes multiple extending arms forming the star pattern, with stimulus-responsive elements 1920A, 1920B, and 1920C coupled to different regions of the substrate. These stimulus-responsive elements may be of the same type or different types, each configured to respond to different environmental stimuli. For example, element 1920A may be responsive to temperature, element 1920B may be responsive to humidity, and element 1920C may be responsive to pH level. Other possible environmental stimuli that the elements may be configured to detect include liquid immersion, chemical exposure, and pressure.

A detection component 1950 is embedded within the substrate 1910 and configured to deform with the substrate. The detection component 1950 may comprise a passive antenna that extends along portions of the star-shaped substrate, similar to the antenna described in previous embodiments. This passive antenna is configured to reflect interrogation signals with detectable changes in signal characteristics corresponding to the change in configuration of the substrate.

The substrate 1910 is configured to change configuration in response to at least one environmental stimulus. This change in configuration causes a detectable change in a measurable characteristic of the detection component 1950, which can be wirelessly detected.

The stimulus-responsive elements 1920A, 1920B, and 1920C may be configured to respond differently to different environmental stimuli, causing distinct configuration changes in the substrate based on the specific environmental stimulus detected. This feature allows the sensor to provide different signal responses depending on the type and intensity of the environmental condition being monitored. The stimulus-responsive elements 1920A, 1920B, and 1920C may cause the substrate 1910's deformation relatively independently, or sequentially. For example, one of the stimulus-responsive elements 1920A, 1920B, and 1920C is an actuator configured to activate the substrate 1910 (e.g., in response to the presence or absence of an environmental stimulus), allowing the substrate 1910 to undergo further deformation in response to one or more environmental stimuli detected by the other one or more of the stimulus-responsive elements 1920A, 1920B, and 1920C.

In some embodiments, the deformable substrate 1910 is further configured to return to an initial configuration upon removal of the environmental stimulus. This reversible deformation capability allows the sensor to be reused for multiple detection cycles, making it suitable for long-term environmental monitoring applications. In some embodiments, the sensor 1900 is disposable.

The sensor 1900 includes multiple stimulus-responsive elements (1920A, 1920B, and 1920C), each configured to respond to a different environmental stimulus. This multistimulus detection capability enables the sensor to monitor various environmental parameters simultaneously with a single device.

FIG. 20 illustrates a process for using a passive environmental sensor, according to some embodiments of the present disclosure. The components and processes described in this figure may be the same as or similar to those described elsewhere in the specification.

The process 2000 begins at 2010 with exposing a substrate having multiple extending arms to an environmental stimulus. The substrate includes an antenna that is embedded within the substrate, extends along at least a portion of the multiple extending arms, and is configured to deform with the substrate. This substrate may be similar to the star-pattern substrate described in previous embodiments.

At 2020, the process 2000 continues with activating the substrate by exposing at least one temperature responsive actuator coupled to the substrate to an environmental temperature that exceeds a threshold. The temperature responsive actuator may be similar to the actuators described in earlier figures, such as temperature-responsive hydrogels that contract when exposed to specific temperature conditions.

Following activation, at 2030, the process 2000 proceeds with transforming the substrate into at least one three-dimensional configuration in response to immersion duration in a liquid. This transformation causes a detectable change in electromagnetic signal characteristics of the antenna. As described in previous embodiments, the transformation may involve sequential deformation of different portions of the substrate over time, which can be used to determine the immersion duration.

At 2040, the process 2000 includes providing, by the antenna, signals with detectable changes in electromagnetic signal characteristics corresponding to each three-dimensional configuration of the substrate. The antenna reflects interrogation signals that originate from a transmitting device. These reflected signals are then detected by a receiving device, which may be the same as or separate from the transmitting device. This bistatic configuration (where transmitter and receiver are separate) or monostatic configuration (where they are integrated) offers flexibility in deployment scenarios. Transmitting devices may include dedicated interrogation beacons on vessels or aircraft, while receiving devices may include specialized receivers on rescue craft, distributed sensor networks, or satellite communication systems. The advantage of separate transmitter and receiver setups is the potential for increased detection range and coverage area. When the transmitter's interrogation signal reaches the sensor, the antenna reflects it back with characteristics modified by the sensor's current three-dimensional configuration, allowing the receiver to detect information about environmental conditions such as immersion duration and temperature. During this step, the sensor's unique identification is also determined through the same interrogation process, enabling rescue teams to identify specific personnel and prioritize rescue operations accordingly.

The process illustrated in FIG. 20 enables passive monitoring of environmental conditions without requiring active power sources, making it suitable for long-term deployment in remote or harsh environments.

The passive wireless mechanical metamaterial sensor as disclosed herein may be configured to measure additional environmental parameters beyond temperature and immersion time. In some cases, the sensor may be adapted to measure humidity and pH levels in the surrounding environment.

For humidity sensing, the sensor may incorporate hygroscopic materials that change their physical properties in response to moisture content in the air. These materials may be integrated into specific portions of the star pattern structure or combined with the stimuli-responsive polymers. As the hygroscopic materials absorb or release moisture, they may induce additional mechanical strain in the sensor structure, potentially causing further shape morphing that can be detected through changes in the antenna's electromagnetic signature.

pH sensing capabilities may be achieved by incorporating pH-sensitive hydrogels or other responsive materials into the sensor design. These materials may undergo swelling or de-swelling in response to changes in pH levels, similar to the temperature-responsive behavior of the hydrogels used for temperature sensing. The pH-induced shape changes may result in detectable variations in the sensor's geometry and corresponding alterations in its wireless signal characteristics.

The passive wireless mechanical metamaterial sensor may find applications in various fields beyond maritime safety. In agricultural settings, the sensor may be adapted to monitor soil moisture content, temperature, and pH levels. For example, multiple sensors may be distributed across a field to provide real-time data on environmental conditions affecting crop growth. The antenna design for agricultural applications may be optimized for longer-range communication to cover larger areas, potentially incorporating directional elements to improve signal strength when interrogated by fixed reader stations.

In mining operations, the sensor may be used to monitor environmental conditions in underground tunnels or open-pit mines. The sensor may be configured to detect the presence of specific gases, changes in air pressure, or early signs of structural instability. For mining applications, the antenna design may prioritize robustness and resistance to interference from surrounding rock formations, potentially employing multi-band or frequency-hopping techniques to ensure reliable communication in challenging environments.

First responders, such as firefighters, may benefit from wearable versions of the sensor adapted to monitor environmental conditions in hazardous situations. The sensor may be integrated into protective gear to detect temperature changes, the presence of toxic gases, or structural instabilities in burning buildings. For firefighting applications, the antenna design may focus on maintaining performance under extreme heat conditions and in the presence of electromagnetic interference from fire and rescue equipment.

In some cases, the passive wireless mechanical metamaterial sensor may be designed for reusability. For applications where the sensor is not exposed to extreme conditions or irreversible chemical changes, the shape-morphing behavior may be reversible. The star pattern structure and stimuli-responsive materials may be selected to allow the sensor to return to its original configuration once the environmental stimulus is removed. This reusability may be particularly valuable in long-term monitoring applications or scenarios where frequent sensor replacement is impractical.

The versatility of the passive wireless mechanical metamaterial sensor may allow for customization to suit a wide range of environmental monitoring needs across various industries and applications. By carefully selecting stimuli-responsive materials, optimizing the star pattern geometry, and tailoring the antenna design, the sensor may be adapted to provide valuable environmental data in diverse settings without requiring active power sources or complex electronic components.

The following examples are illustrative of several embodiments of the present technology:

Solution 1. A passive wireless mechanical metamaterial sensor, comprising:

a flexible substrate having multiple extending arms;

at least one temperature responsive actuator coupled to the substrate; and an antenna embedded within the substrate and extending along at least a portion of the multiple extending arms, the antenna configured to deform with the substrate, wherein:

the substrate is configured to be activated upon exposure of the at least one temperature responsive actuator to an environmental temperature that exceeds a threshold; and the substrate is further configured to transform into at least one three-dimensional configuration in response to a duration of immersion in a liquid following the activation, the three-dimensional configuration causing a detectable change in electromagnetic signal characteristics of the antenna.

Solution 2. The passive wireless mechanical metamaterial sensor of one or more of solution 1 or any other solutions disclosed herein, wherein the substrate comprises a skeleton including thermoplastic polyurethane (TPU) or polydimethylsiloxane (PDMS).

Solution 3. The passive wireless mechanical metamaterial sensor of one or more of solution 2 or any other solutions disclosed herein, further comprising an elastomer coating applied over the skeleton.

Solution 4. The passive wireless mechanical metamaterial sensor of one or more of solution 1 or any other solutions disclosed herein, wherein the at least one temperature responsive actuator comprises temperature-responsive hydrogels.

Solution 5. The passive wireless mechanical metamaterial sensor of one or more of solution 4 or any other solutions disclosed herein, wherein the temperature-responsive hydrogels comprise N-tert-butyl acrylamide (NTBAM)-N-isopropyl acrylamide (NIPAM)-acrylamide (AM) copolymer hydrogels.

Solution 6. The passive wireless mechanical metamaterial sensor of one or more of solution 1 or any other solutions disclosed herein, wherein the at least one temperature responsive actuator comprises a first temperature responsive actuator and a second temperature responsive actuator coupled to different regions of the substrate, respectively.

Solution 7. The passive wireless mechanical metamaterial sensor of one or more of solution 1 or any other solutions disclosed herein, wherein the at least one temperature responsive actuator comprises a temperature responsive actuator coupled to different regions of the substrate simultaneously.

Solution 8. The passive wireless mechanical metamaterial sensor of one or more of solution 1 or any other solutions disclosed herein, wherein the at least one temperature responsive actuator is connected to the substrate via an elastomer connector.

Solution 9. The passive wireless mechanical metamaterial sensor of one or more of solution 1 or any other solutions disclosed herein, wherein the at least one temperature responsive actuator contracts when exposed to the environmental temperature that exceeds the threshold, thereby applying tension to the substrate.

Solution 10. The passive wireless mechanical metamaterial sensor of one or more of solution 1 or any other solutions disclosed herein, wherein the at least one temperature responsive actuator is pre-tensioned when connected to the substrate prior to being exposed to the environmental temperature that exceeds the threshold.

Solution 11. The passive wireless mechanical metamaterial sensor of one or more of solution 1 or any other solutions disclosed herein, wherein the multiple extending arms radiate outward from a central portion of the substrate to form a star pattern.

Solution 12. The passive wireless mechanical metamaterial sensor of one or more of solution 1 or any other solutions disclosed herein, further comprising an identification chip.

Solution 13. The passive wireless mechanical metamaterial sensor of one or more of solution 12 or any other solutions disclosed herein, wherein the identification chip is a radio-frequency identification (RFID) chip.

Solution 14. The passive wireless mechanical metamaterial sensor of one or more of solution 1 or any other solutions disclosed herein, wherein the substrate comprises one or more mechanical notches positioned along its arms.

Solution 15. The passive wireless mechanical metamaterial sensor of one or more of solution 14 or any other solutions disclosed herein, wherein the one or more mechanical notches contain a soluble notch filler configured to dissolve when exposed to the liquid.

Solution 16. The passive wireless mechanical metamaterial sensor of one or more of solution 15 or any other solutions disclosed herein, wherein the soluble notch filler comprises poly(vinyl alcohol) (PVA).

Solution 17. The passive wireless mechanical metamaterial sensor of one or more of solution 15 or any other solutions disclosed herein, wherein the soluble notch filler in each of the one or more mechanical notches has a predetermined dimension that relates to a dissolution rate when exposed to the liquid, wherein dissolution of the soluble notch filler in a mechanical notch causes a corresponding arm of the multiple extending arms to deform, thereby causing the substrate to achieve one of the at least one three-dimensional configuration.

Solution 18. The passive wireless mechanical metamaterial sensor of one or more of solution 17 or any other solutions disclosed herein, wherein different dimensions of the soluble notch filler in different mechanical notches cause sequential deformation of different arms over time, resulting in a progressive transformation of the substrate.

Solution 19. The passive wireless mechanical metamaterial sensor of one or more of solution 1 or any other solutions disclosed herein, wherein the substrate is further configured to transform into a plurality of different three-dimensional configurations in response to the duration of immersion in the liquid following the activation, each of the plurality of different three-dimensional configurations causing a corresponding detectable change in electromagnetic signal characteristics of the antenna.

Solution 20. A method of monitoring environmental conditions using a passive wireless mechanical metamaterial sensor, comprising:

exposing a substrate having multiple extending arms to an environmental stimulus, wherein the substrate includes an antenna that is embedded within the substrate, extends along at least a portion of the multiple extending arms, and configured to deform with the substrate;

activating the substrate by exposing at least one temperature responsive actuator coupled to the substrate to an environmental temperature that exceeds a threshold;

transforming the substrate into at least one three-dimensional configuration in response to the duration of immersion in a liquid following the activation, the three-dimensional configuration causing a detectable change in electromagnetic signal characteristics of the antenna; and providing, by the antenna, signals with the detectable changes in electromagnetic signal characteristics corresponding to each of the at least one three-dimensional configuration of the substrate, wherein the changes in the signal characteristics indicate the specific three-dimensional configuration of the substrate.

Solution 21. The method of one or more of solution 20 or any other solutions disclosed herein, further comprising determining the duration on sequential deformation of different portions of the substrate over time.

Solution 22. The method of one or more of solution 20 or any other solutions disclosed herein, further comprising determining an identification of the sensor by wirelessly interrogating an identification chip on the sensor.

Solution 23. A system for monitoring personnel in marine environments, comprising:

a wearable patch including a passive wireless mechanical metamaterial sensor, the sensor comprising: a substrate with multiple extending arms, an embedded antenna, and an identification chip; and a remote reader configured to wirelessly interrogate the sensor, wherein the substrate is configured to undergo shape morphing in response to environmental stimuli, causing detectable changes in an electromagnetic signature of the embedded antenna.

Solution 24. The system of one or more of solution 23 or any other solutions disclosed herein, wherein the substrate comprises one or more mechanical notches positioned along its arms, the one or more mechanical notches containing a soluble notch filler configured to dissolve upon exposure to water.

Solution 25. The system of one or more of solution 24 or any other solutions disclosed herein, wherein the soluble notch filler comprises poly(vinyl alcohol) (PVA).

Solution 26. The system of one or more of solution 23 or any other solutions disclosed herein, wherein the substrate further comprises at least one temperature responsive actuator coupled to different ends of the substrate.

Solution Solution 27. The system of one or more of solution 26 or any other solutions disclosed herein, wherein the at least one temperature responsive actuator comprises temperature-responsive hydrogels.

Solution 28. The system of one or more of solution 27 or any other solutions disclosed herein, wherein the temperature-responsive hydrogels comprise N-tert-butyl acrylamide (NTBAM)-N-isopropyl acrylamide (NIPAM)-acrylamide (AM) copolymer hydrogels.

Solution 29. A passive environmental sensor, comprising:

a deformable substrate;

at least one stimulus-responsive element coupled to the substrate; and a detection component embedded within the substrate and configured to deform with the substrate, wherein:

the substrate is configured to change configuration in response to at least one environmental stimulus, and the change in configuration of the substrate causes a detectable change in a measurable characteristic of the detection component.

Solution 30. The passive environmental sensor of one or more of solution 29 or any other solutions disclosed herein, wherein the at least one environmental stimulus comprises at least one of temperature, liquid immersion, humidity, chemical exposure, pressure, or pH level.

Solution 31. The passive environmental sensor of one or more of solution 29 or any other solutions disclosed herein, wherein the stimulus-responsive element is configured to respond differently to different environmental stimuli, causing distinct configuration changes in the substrate based on the specific environmental stimulus detected.

Solution 32. The passive environmental sensor of one or more of solution 29 or any other solutions disclosed herein, wherein the substrate is configured to return to an initial configuration upon removal of the at least one environmental stimulus, allowing the sensor to be reused for multiple detection cycles.

Solution 33. The passive environmental sensor of one or more of solution 29 or any other solutions disclosed herein, wherein the detection component comprises a passive antenna configured to reflect interrogation signals with detectable changes in signal characteristics corresponding to the change in configuration of the substrate.

Solution 34. The passive environmental sensor of one or more of solution 29 or any other solutions disclosed herein, wherein the substrate includes multiple stimulus-responsive elements, each configured to respond to a different environmental stimulus.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A passive wireless mechanical metamaterial sensor, comprising:

a flexible substrate having multiple extending arms;

at least one temperature responsive actuator coupled to the substrate; and an antenna embedded within the substrate and extending along at least a portion of the multiple extending arms, the antenna configured to deform with the substrate, wherein:

the substrate is configured to be activated upon exposure of the at least one temperature responsive actuator to an environmental temperature that exceeds a threshold; and the substrate is further configured to transform into at least one three-dimensional configuration in response to a duration of immersion in a liquid following the activation, the three-dimensional configuration causing a detectable change in electromagnetic signal characteristics of the antenna.

2. The passive wireless mechanical metamaterial sensor of claim 1, wherein the at least one temperature responsive actuator comprises temperature-responsive hydrogels.

3. The passive wireless mechanical metamaterial sensor of claim 2, wherein the temperature-responsive hydrogels comprise N-tert-butyl acrylamide (NTBAM)-N-isopropyl acrylamide (NIPAM)-acrylamide (AM) copolymer hydrogels.

4. The passive wireless mechanical metamaterial sensor of claim 1, wherein the at least one temperature responsive actuator comprises a first temperature responsive actuator and a second temperature responsive actuator coupled to different regions of the substrate, respectively.

5. The passive wireless mechanical metamaterial sensor of claim 1, wherein the at least one temperature responsive actuator comprises a temperature responsive actuator coupled to different regions of the substrate simultaneously.

6. The passive wireless mechanical metamaterial sensor of claim 1, wherein the at least one temperature responsive actuator is connected to the substrate via an elastomer connector.

7. The passive wireless mechanical metamaterial sensor of claim 1, wherein the at least one temperature responsive actuator contracts upon exposure to the environmental temperature that exceeds the threshold, thereby applying tension to the substrate.

8. The passive wireless mechanical metamaterial sensor of claim 1, wherein the at least one temperature responsive actuator is pre-tensioned when connected to the substrate prior to being exposed to the environmental temperature that exceeds the threshold.

9. The passive wireless mechanical metamaterial sensor of claim 1, wherein the multiple extending arms radiate outward from a central portion of the substrate to form a star pattern.

10. The passive wireless mechanical metamaterial sensor of claim 1, further comprising an identification chip.

11. The passive wireless mechanical metamaterial sensor of claim 1, wherein the substrate comprises one or more mechanical notches positioned along its arms.

12. The passive wireless mechanical metamaterial sensor of claim 11, wherein the one or more mechanical notches contain a soluble notch filler configured to dissolve upon exposure to the liquid.

13. The passive wireless mechanical metamaterial sensor of claim 12, wherein the soluble notch filler comprises poly(vinyl alcohol) (PVA).

14. The passive wireless mechanical metamaterial sensor of claim 12, wherein the soluble notch filler in each of the one or more mechanical notches has a predetermined dimension that relates to a dissolution rate upon exposure to the liquid, wherein dissolution of the soluble notch filler in a mechanical notch causes a corresponding arm of the multiple extending arms to deform, thereby causing the substrate to achieve one of the at least one three-dimensional configuration.

15. The passive wireless mechanical metamaterial sensor of claim 14, wherein different dimensions of the soluble notch filler in different mechanical notches cause sequential deformation of different arms over time, resulting in a progressive transformation of the substrate.

16. The passive wireless mechanical metamaterial sensor of claim 1, wherein the substrate is further configured to transform into a plurality of different three-dimensional configurations in response to the duration of immersion in the liquid following the activation, each of the plurality of different three-dimensional configurations causing a corresponding detectable change in electromagnetic signal characteristics of the antenna.

17. A method of monitoring environmental conditions using a passive wireless mechanical metamaterial sensor, comprising:

exposing a substrate having multiple extending arms to an environmental stimulus, wherein the substrate includes an antenna that is embedded within the substrate, extends along at least a portion of the multiple extending arms, and configured to deform with the substrate;

activating the substrate by exposing at least one temperature responsive actuator coupled to the substrate to an environmental temperature that exceeds a threshold;

transforming the substrate into at least one three-dimensional configuration in response to a duration of immersion in a liquid following the activation, the three-dimensional configuration causing a detectable change in electromagnetic signal characteristics of the antenna; and providing, by the antenna, signals with the detectable changes in electromagnetic signal characteristics corresponding to each of the at least one three-dimensional configuration of the substrate, wherein the changes in the signal characteristics indicate the specific three-dimensional configuration of the substrate.

18. The method of claim 17, further comprising determining the duration on sequential deformation of different portions of the substrate over time.

19. The method of claim 17, further comprising determining an identification of the sensor by wirelessly interrogating an identification chip on the sensor.

20. A system for monitoring personnel in marine environments, comprising:

a wearable patch including a passive wireless mechanical metamaterial sensor, the sensor comprising: a substrate with multiple extending arms, an embedded antenna, and an identification chip; and a remote reader configured to wirelessly interrogate the sensor, wherein the substrate is configured to undergo shape morphing in response to environmental stimuli, causing detectable changes in an electromagnetic signature of the embedded antenna.

\* \* \* \* \*